(12) United States Patent
Leen et al.

(10) Patent No.: US 12,523,530 B2
(45) Date of Patent: Jan. 13, 2026

(54) OPTICAL CAVITY FOR ABSORPTION SPECTROSCOPY AND METHODS OF ASSEMBLY

(71) Applicant: Nikira Labs Inc., Mountain View, CA (US)

(72) Inventors: John Brian Leen, Sunnyvale, CA (US); Manish Gupta, Mountain View, CA (US); Rupal Gupta, Mountain View, CA (US)

(73) Assignee: Nikira Labs Inc., Mountain View, CA (US)

( * ) Notice: Subject to any disclaimer, the term of this patent is extended or adjusted under 35 U.S.C. 154(b) by 197 days.

(21) Appl. No.: 18/370,809

(22) Filed: Sep. 20, 2023

(65) Prior Publication Data

US 2024/0410755 A1   Dec. 12, 2024

Related U.S. Application Data

(63) Continuation-in-part of application No. 18/207,936, filed on Jun. 9, 2023.

(51) Int. Cl.
  *G01J 3/42* (2006.01)
  *G01J 3/02* (2006.01)

(52) U.S. Cl.
  CPC .............. *G01J 3/42* (2013.01); *G01J 3/0202* (2013.01); *G01J 3/0208* (2013.01);
  (Continued)

(58) Field of Classification Search
  CPC .............. G01J 2003/423; G01J 3/0202; G01J 3/0208; G01J 3/021; G01J 3/0237;
  (Continued)

(56) References Cited

U.S. PATENT DOCUMENTS

| 3,652,954 A | 3/1972 | Snitzer |
| 4,793,709 A | 12/1988 | Jabr et al. |

(Continued)

FOREIGN PATENT DOCUMENTS

| CN | 210231911 U | 4/2020 |
| DE | 3028415 A1 | 2/1982 |

(Continued)

OTHER PUBLICATIONS

PCT/US2024/029310. International Search Report & Written Opinion (Oct. 28, 2024).

(Continued)

*Primary Examiner* — Hina F Ayub
(74) *Attorney, Agent, or Firm* — LOZA & LOZA, LLP; David S. Sarisky

(57) ABSTRACT

An optical cavity includes a cell having at least one structure with a first end and a second end, a first end-cap configured to removably receive a first mirror, and a second end-cap configured to removably receive a second mirror. The first end-cap is attached to the structure at the first end and has an opening with a center axis. The second end-cap is attached to the structure at the second end and has an opening with a center axis that is axially aligned with the center axis of the first end-cap. The cell can be a closed cell, wherein the structure is a tube axially aligned with the center axis. The cell can be an open cell, wherein the structure is a tube that includes one or more openings through its wall. The cell can be an open cell, wherein the structure includes one or more rods, each off axis from the center axis.

19 Claims, 19 Drawing Sheets

(52) U.S. Cl.
CPC ........... *G01J 3/0237* (2013.01); *G01J 3/0291* (2013.01); *G01J 2003/423* (2013.01)

(58) Field of Classification Search
CPC .... G01J 3/0291; G01J 3/42; G01N 2021/391; G01N 21/031
See application file for complete search history.

(56) References Cited

U.S. PATENT DOCUMENTS

| | | | |
|---|---|---|---|
| 5,291,265 | A | 3/1994 | Kebabian |
| 5,432,610 | A | 7/1995 | King et al. |
| 5,506,678 | A | 4/1996 | Carlsen et al. |
| 5,528,040 | A | 6/1996 | Lehmann |
| 5,912,740 | A | 6/1999 | Zare et al. |
| 6,795,190 | B1 | 9/2004 | Paul et al. |
| 7,307,716 | B2 | 12/2007 | Silver |
| 9,709,491 | B1 | 7/2017 | Murphy et al. |
| 10,048,196 | B2 | 8/2018 | Harb et al. |
| 11,674,888 | B2 * | 6/2023 | Pickrell ................ G01N 21/031 356/246 |
| 2011/0164251 | A1 * | 7/2011 | Richter ................ G01N 21/031 356/440 |
| 2016/0084757 | A1 | 3/2016 | Miron |
| 2021/0131947 | A1 | 5/2021 | Pickrell et al. |

FOREIGN PATENT DOCUMENTS

| | | | |
|---|---|---|---|
| EP | 0596605 | A1 | 5/1994 |
| EP | 2422225 | A2 | 2/2012 |

OTHER PUBLICATIONS

Herndon et al.; "Astigmatic Multipass Absorption Cells Lightweight Astigmatic Multipass Absorption Cell—AMAC-36LW"; Aerodyne Research; https://www.aerodyne.com/product/astigmatic-multipass-absorption-cells/; Printed Apr. 28, 2023; 6 pages.

Ideal Spectroscopy; "Cavity Ring Down Spectroscopy Cell, 50 cm Pathlength, Adjustable Mounts for 1 in. OD Optics, Mounting Hardware Included."; https://www.idealspectroscopy.com/printRegproductbidealspectroscopy.asp?pid=1103; Printed Apr. 28, 2023; 2 pages.

Courtois, Jérémie; "High-speed off-axis Cavity Ring-Down Spectroscopy with a re-entrant configuration for spectral resolution enhancement"; Optical Society of America; (Mar. 1, 2010).

Gupta, Manish; "Optimization of Off-Axis ICOS and Applications to Flow Tube Kinetics"; (Dec. 31, 2003).

Kasyutich, V.L.; "Laser beam patterns of an optical cavity formed by two twisted cylindrical mirrors"; (Jan. 5, 2009).

Liu, Jianhui; "Design and research of built-in sample cell with multiple optical reflections"; (Oct. 24, 2017).

McManus et al.; "Astigmatic mirror multipass absorption cells for long-path-length spectroscopy"; Appl. Opt. 34; 3336-3348 (1995).

Schwarm et al.; "Calibration-free breath acetone sensor with interference correction based on wavelength modulation spectroscopy near 8.2 μm"; Appl. Phys; B 126, 9 (2020).

Wang; "Development of a portable cavity-enhanced absorption spectrometer for the measurement of ambient NO3 and N2O5: experimental setup, lab characterizations, and field applications in a polluted urban environment"; (Sep. 27, 2016).

\* cited by examiner

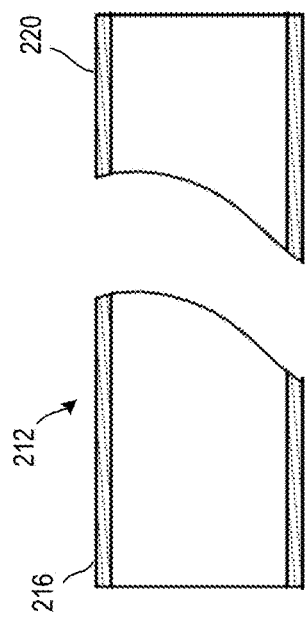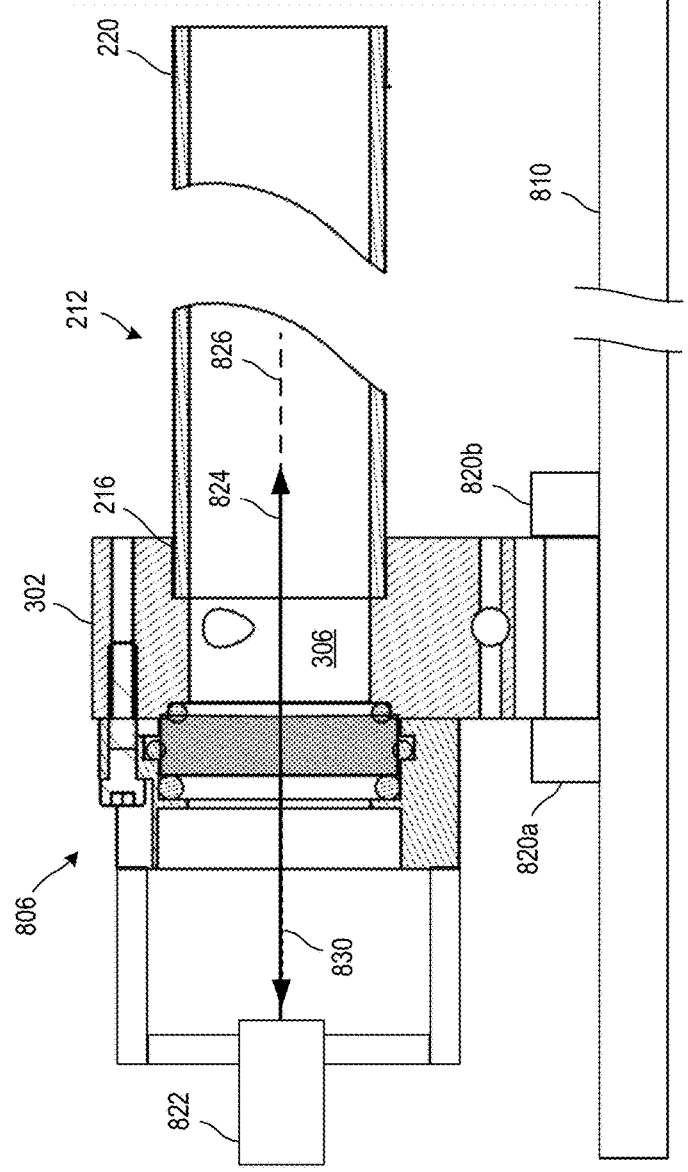

OPTICAL CAVITY FOR ABSORPTION SPECTROSCOPY AND METHODS OF ASSEMBLY

CROSS-REFERENCE TO RELATED APPLICATION

This application is a continuation-in-part of U.S. application Ser. No. 18/207,936, filed on Jun. 9, 2023, entitled "Cell and Optical Cavity for Absorption Spectroscopy and Methods of Assembly," now U.S. Pat. No. 12,379,309, which is expressly incorporated by reference herein in its entirety.

GOVERNMENT LICENSE RIGHTS

This invention was made with government support under EPA Contract No. 68HERC22C0037. The government has certain rights in the invention.

TECHNICAL FIELD

The present disclosure relates generally to optical absorption spectroscopy, and more particularly, to a cell for an optical cavity and methods of assembling the cell, where the cell enables removal and replacement of mirrors without affecting the alignment of the optical cavity.

BACKGROUND

Methods for optical absorption spectroscopy rely on carefully aligned mirrors to reflect light through a sample under test multiple times. Because the number of reflections can be large (tens to thousands of bounces) the alignment of the two or more mirrors relative to one another is critical for the success of these methods. Examples of spectroscopic methods that require a high precision and stable mechanical structure to position optics are cavity ringdown spectroscopy (CRDS), integrated cavity output spectroscopy (ICOS), off-axis ICOS (OA-ICOS), cavity enhanced absorption spectroscopy (CEAS), and multi-pass absorption spectroscopy (e.g., White or Herriott cells).

The mechanical structure, referred to herein as a "cell," that holds the mirrors relative to one another must satisfy tight tolerances, specifically for the tilt of the mirrors relative to the central optical axis of the cell and in some cases the mirror to mirror distance. Current approaches to manufacture cells that rigidly and stably hold two or more mirrors relative to one another are costly and complicated for various reasons.

One approach is to construct a cell from screwed/bolted together components with manually adjustable mirrors on flexible mounts that can be intermittently aligned by expert personnel. This is typically achieved by holding the mirrors in kinematic mounts while making the connection to the cell flexible using large o-rings or bellows. The alignment of the mirrors can then be adjusted to suit the application. This method is costly because of the time required for repeated alignment and also suffers from failure due to vibration or shock induced movement. It is thus typically only used in laboratory and research applications. See https://www.idealspectroscopy.com/printRegproductbidealspectroscopy.asp?pid=1103 for an example of an expert adjustable cell.

A second approach is to machine a cell having mirror-holding ends from a single piece of material (e.g., aluminum, steel, invar, etc.) with tight tolerances on concentricity, parallelism and length of the mirror-holding ends. "Concentricity" as used herein means the center axis of the opening of the mirror-holding end at one end of the cell is aligned with the center axis of the opening of the mirror-holding end at the other end of the cell. "Parallelism" as used herein means the mirror-landing surface of the mirror-holding end at one end of the cell is parallel with the mirror-landing surface of the mirror-holding end at the other end of the cell. "Length" as used herein means the center-to-center separation between mirrors. This machining approach is possible for short cells (less than ~20 cm for 1" diameter mirrors), when machine tools can easily bore the center of the cell. Unfortunately, longer cells are often required and this approach is untenable for cells beyond about 30 cm and expensive for cells in the 10-30 cm range.

A variation of the second approach is to weld mirror-holding end-caps to the ends of an extruded tube or seam-welded tube. Welding, however, induces heat stress bending of the tube and the mirror-holding end-caps that affects the concentricity and parallelism of the cell. Furthermore, during assembly, once the mirror-holding ends caps are welded to the tube they cannot be adjusted to achieve concentricity and parallelism. Thus, the welded-on mirror-holding end-caps have to be machined to produce acceptable parallelism and concentricity. The cost of this multi-step fabrication is very high.

A third approach is to connect mirror-holding end-caps of a cell with rods using machine tolerances (e.g., +/−0.005") on the rods. This method is most commonly used for multi-pass cells where the alignment errors can be compensated for by adjusting the alignment of the input beam. This method is akin to the second approach above, but typically has lower tolerances. See https://www.aerodyne.com/product/ astigmatic-multipass-absorption-cells/ for an example of a bolted together multi-pass cell.

A fourth approach involves optically aligning mirrors on a cell using a laser and then permanently affixing the mirrors to the cell using adhesive. The mirrors, however, cannot be removed for cleaning or replacement. Although this method is often used for its robustness, the optical cavity cannot be serviced and must be discarded if it becomes excessively dirty.

In some experimental sampling methods, the sample under test is confined by or contained in the cell in the space or cavity between the two mirrors. In these methods the cell may be referred to as a "closed cell." In other experimental sampling methods, the sample under test freely floats in and out of the space between two or more mirrors. In these methods, the cell may be referred to as an "open cell." In either cell configuration, the mechanical structure that holds the mirrors relative to one another must satisfy tight tolerances, specifically for the tilt of the mirrors relative to the central optical axis of the cell and in some cases the mirror to mirror distance. In either cell configuration, a sample under test in the space between two or more mirrors, whether confined (in the case of a closed cell) or freely floating (in the case of an open cell), may be referred to as a "sample volume."

In summary, current approaches to manufacture cells that rigidly and stably hold two or more mirrors relative to one another to achieve optical alignment of the mirrors depend on precisely machined mirror mounts or permanently affixing the mirrors to the cell. However, these methods are costly for long cells and prohibit mirror cleaning/replacement respectively.

SUMMARY

In one aspect, the disclosure relates to a cell for an optical cavity. The cell includes a tube with a first open-end and a second open-end, a first end-cap, and a second end-cap. The first end-cap is fixedly attached to the tube at the first open-end and has an opening with a center axis. The second end-cap is fixedly attached to the tube at the second open-end and has an opening with a center axis that is axially aligned with the center axis of the first end-cap. "Fixedly attached" as used herein means the first-end cap and the second end-cap are attached to the tube in a way that does not allow for separation of the components in a way that preserves the original form and structural integrity of the components. For example, components that are attached together by a screw are not fixedly attached as they can be separated by removing the screw to preserve the original form and structural integrity of the components, while components that are adhered or welded together are fixedly attached since they cannot be separated without altering the original form of the components or damaging the structural integrity of the components (e.g., cutting through the components).

In another aspect, the disclosure relates to a method of assembling a cell for an optical cavity. The method includes aligning a laser beam with an optical axis of a first mirror secured in a first end-cap that is secured in place relative to a surface; coupling a first open-end of a tube to the first end-cap; coupling a second end-cap to a second open-end of the tube; optically aligning the second end-cap with the first end-cap; securing the second end-cap in place relative to the surface; and fixedly attaching the first open end of the tube to the first end-cap and the second open end of the tube to the second end-cap. "Fixedly attaching" as used herein means attaching the first-end cap and the second end-cap to the tube in a way that does not allow for separation of the components in a way that preserves the original form and structural integrity of the components. For example, attaching two components together using a screw is not fixedly attaching the components as they can be separated by removing the screw, while attaching two components together using an adhesive or metal weld is fixedly attaching the components since they cannot be separated without altering the original form of the components or damaging the structural integrity of the components (e.g., cutting through the components).

In another aspect, the disclosure relates to an optical cavity. The optical cavity includes a cell and a first mirror and a second mirror removably coupled to the cell. The cell includes a tube with a first open-end and a second open-end. The first end-cap is fixedly attached at the first open-end and has an opening with a center axis. The second end-cap is fixedly attached at the second open-end and has an opening with a center axis that is optically aligned with the center axis of the first end-cap. The first mirror is removably coupled with the first end-cap by a first mirror clamp assembly such that the center of the first mirror is axially aligned with the center axis of the first end-cap. The second mirror is removably coupled with the second end-cap by a second mirror clamp assembly such that the center of the second mirror is axially aligned with the center axis of the second end-cap. "Removably coupled" as used herein means the first mirror (or second mirror) is coupled to the first end-cap (or second end-cap) in a way that allows for separation of the components in a way that preserves the original form and structural integrity of the components. For example, components that are attached together by a screw are removable coupled together as they can be separated by removing the screw without altering the original form and structural integrity of the components.

In another aspect, the disclosure relates to a cell for an optical cavity. The cell includes at least one structure with a first end and a second end, a first end-cap configured to removably receive a first mirror, and a second end-cap configured to removably receive a second mirror. The first end-cap is attached to the at least one structure at the first end and has an opening with a center axis. The second end-cap is attached to the at least one structure at the second end and has an opening with a center axis that is axially aligned with the center axis of the first end-cap. The first end-cap and the second end-cap can be fixedly attached or permanently attached to the structure by a cured adhesive. The first end-cap and the second end-cap can be removably attached or semi-permanently attached to the structure by mechanical means, such as a clamp and clamping hardware. The cell can be a closed cell, wherein the at least one structure is a tube that is axially aligned with the center axis. The cell can be an open cell, wherein the at least one structure includes one or more rods or rails or tubes, each off axis from the center axis. The cell can be an open cell, wherein the at least one structure is a tube that is axially aligned with the center axis and includes one or more openings, e.g., slots, through the wall of the tube that enable a sample to freely float in and out of the space between the mirrors.

In another aspect, the disclosure relates to a method of assembling a cell for an optical cavity. The method includes aligning a laser beam with an optical axis of a first mirror that is secured in a first end-cap that is secured in place relative to a surface; coupling a first end of at least one structure to the first end-cap; coupling a second end-cap to a second end of the at least one structure; optically aligning the second end-cap with the first end-cap; securing the second end-cap in place relative to the surface; and attaching the first end of the at least one structure to the first end-cap and the second end of the at least one structure to the second end-cap.

In some cases, the first end-cap comprises an opening and the second end-cap comprises an opening and the at least one structure is a tube. The method further includes applying adhesive to the first end of the tube; inserting the first end of the tube into the opening of the first end-cap; applying adhesive to the second end of the tube; and placing the opening of the second end-cap over the second end of the at least one structure. After the first end-cap and the second end-cap are optically aligned, the tube is fixedly attached to the ends-caps by curing the adhesive. The assembled cell thus defines a closed cell configured to contain a sample under test within the space between mirrors attached to the end-caps of the cell. In some embodiments, the assembled cell may be made into an open cell by forming one or more openings through the wall of the tube to enable a sample to freely float in and out of the space between mirrors attached to the end-caps of the cell.

In some cases, the first end-cap comprises an opening and at least one receptacle off axis from the axis of the opening, the second end-cap comprises an opening and at least one receptacle off axis from the axis of the opening, and the at least one structure is a rod or a rail or a tube. In some embodiments, the method further includes applying adhesive to the first end of the at least one rod or rail or tube; inserting the first end of the at least one rod or rail or tube into the at least one receptacle of the first end-cap; applying adhesive to the second end of the at least one rod or rail or tube; and placing the at least one receptacle of the second end-cap over the second end of the at least one structure. After the first end-cap and the second end-cap are optically aligned, the at least one rod is fixedly attached to the ends-caps by curing the adhesive. In some embodiments, the method further includes inserting the first end of the at least one rod or tube into the at least one receptacle of the first end-cap and placing the at least one receptacle of the second end-cap over the second end of the at least one structure. After the first end-cap and the second end-cap are optically aligned, the at least one rod is attached to the ends-caps using a mechanical means, e.g., a clamp and clamping hardware. The attachment by mechanical means may be made permanent by apply adhesive to the mechanical means. In either embodiment, the assembled cell defines an open cell that allows a sample to freely float in and out of the space between mirrors attached to the end-caps of the cell.

In another aspect, the disclosure relates to an optical cavity. The optical cavity includes a cell and a first mirror and a second mirror removably coupled to the cell. The cell includes at least one structure with a first end and a second end. The first end-cap is attached at the first end of the structure and has an opening with a center axis. The second end-cap is attached at the second end of the structure and has an opening with a center axis that is optically aligned with the center axis of the first end-cap.

In some embodiments, the first end-cap and the second-end-cap are fixedly attached to the ends of the structure by a cured adhesive. The cured adhesive may be between respective surfaces of the first end-cap and the at least one structure and between respective surfaces of the second end-cap and the at least one structure. In some embodiments, the first end-cap includes a clamping structure adjacent a receptacle configured to receive a first end of the at least one structure and the first end-cap is attached to the at least one structure by the clamping structure and clamping hardware. Similarly, the second end-cap includes a clamping structure adjacent a receptacle configured to receive a second end of the at least one structure and the second end-cap is attached to the at least one structure by the clamping structure and clamping hardware. The semi-permanent attachment by the clamping structures may be permanent or fixed by a cured adhesive between respective surfaces of the clamping structures the clamping hardware at each of the first enc-cap and the second end-cap.

The first mirror is removably coupled with the first end-cap by a first mirror clamp assembly such that the center of the first mirror is axially aligned with the center axis of the first end-cap. The second mirror is removably coupled with the second end-cap by a second mirror clamp assembly such that the center of the second mirror is axially aligned with the center axis of the second end-cap. The cell can be a closed cell, wherein the at least one structure is a tube that is axially aligned with the center axis. The cell can be an open cell, wherein the at least one structure includes one or more rods or rails or tubes, each off axis from the center axis, or a tube having one or more openings through a wall of the tube.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatuses and methods will now be presented in the detailed description by way of example, and not by way of limitation, with reference to the accompanying drawings, wherein:

FIGS. 8A through 8I are illustrations of various stages of the method of FIG. 7.

DETAILED DESCRIPTION

Disclosed herein is an optical cavity having a cell that enables removal and replacement of mirrors from the optical cavity without affecting the optical alignment of the cavity. The cell includes a preformed chamber, e.g., tube, and end-caps that are optically aligned and permanently attached to opposite ends of the tube such that respective mirror-landing surfaces of the end-caps are substantially parallel. "Substantially parallel" in this regard means that the mirror-landing surfaces are within x degree of being parallel.

Mirror clamps removably secure a respective cavity mirror at each of the end-caps. Because the end-caps are optically aligned and have substantially parallel mirror-landing surfaces, the mirrors secured to the end-caps are also optically aligned. Thus, the optically aligned and permanently attached end-caps serve as a repeatable mounting surface for the cavity mirrors without the need for high precision machining. Also disclosed herein is a method of assembling a cell of an optical cavity so its end-caps are permanently optically aligned and have substantially parallel mirror-landing surfaces.

The cell and optical cavity disclosed herein may be used in multi-pass and cavity enhanced absorption spectroscopies. For example, the optical cavity may be part of an optical system that performs absorption measurements, as described below.

Optical System

Figure 1:
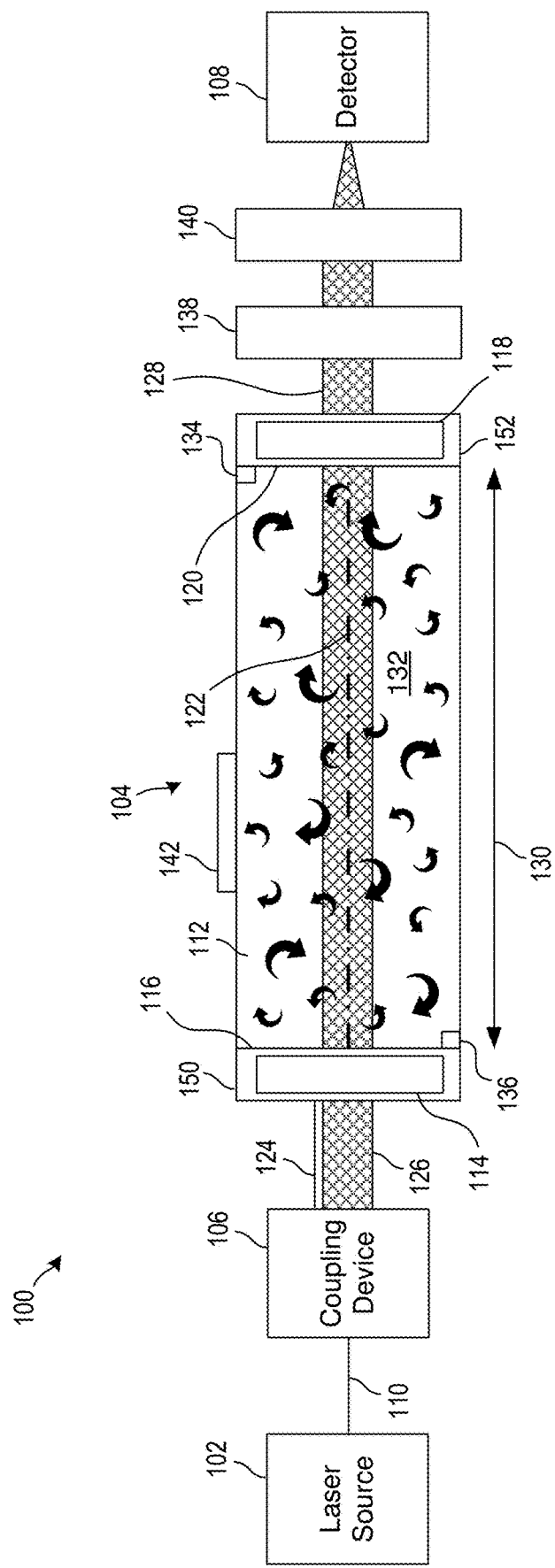
FIG. 1 is a schematic block diagram of an optical system having an optical cavity configured in accordance with embodiments disclosed herein.
Figure 2:
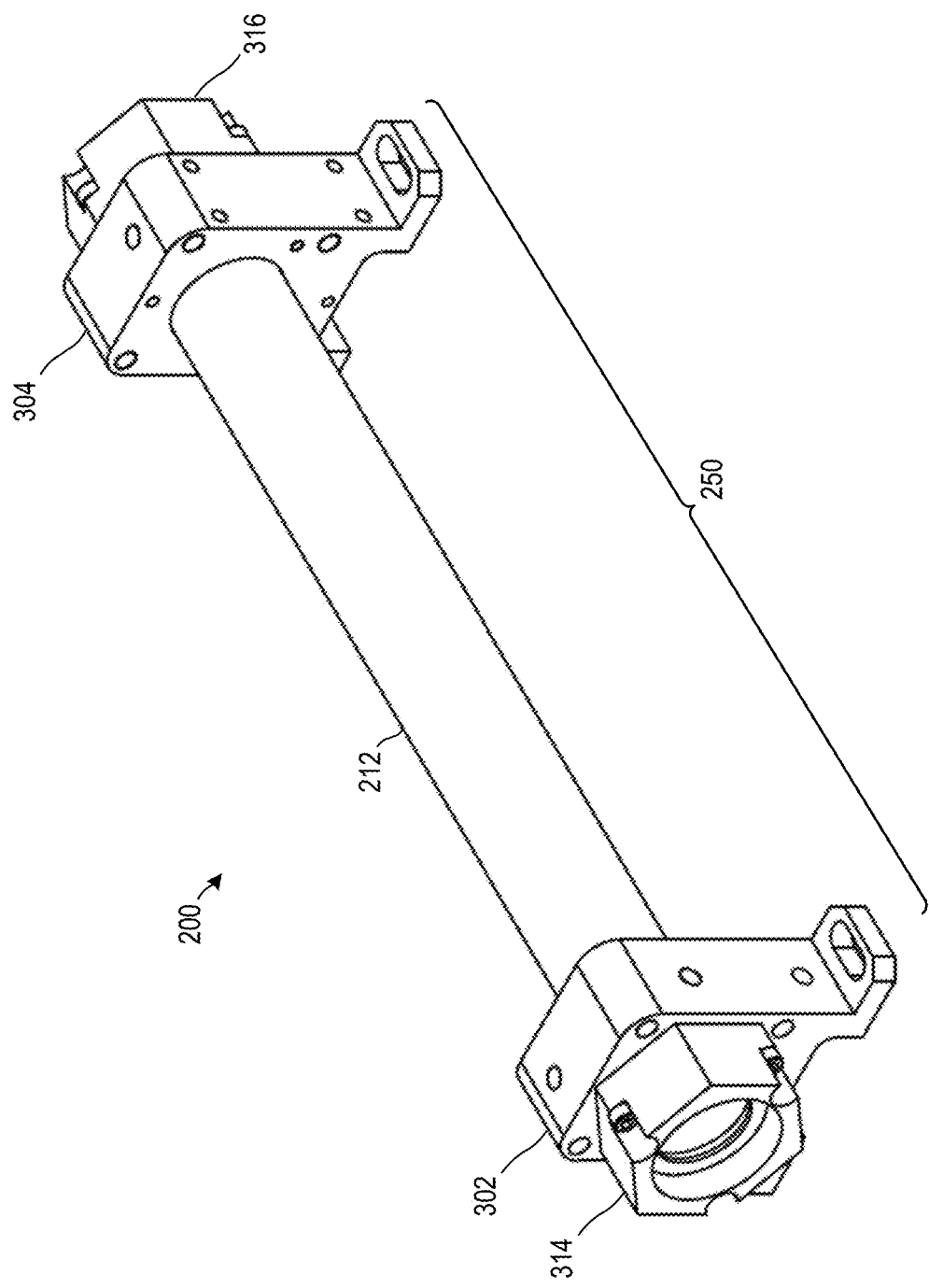
FIG. 2 is a perspective illustration of an optical cavity in accordance with embodiments disclosed herein.

With reference to FIG. 1, an optical system 100 for performing an absorption measurement of a medium sample 132 includes a laser source 102, an optical cavity 104 having a cell configured in accordance with embodiments disclosed herein, a coupling device 106, and a detector 108. The laser source 102 is configured to output a laser beam 110 having a wavelength corresponding to an absorption region of interest. The laser source 102 may be, for example, a distributed feedback, telecommunications-grade butterfly diode laser or quantum cascade laser or dye laser, having a wavelength that may span the entire spectral range from ultraviolet (UV) to infrared (IR).

The optical cavity 104 includes a tube 112, an input mirror 114 secured in place at an input end 116 of the tube by an end-cap 150, an output mirror 118 secured in place at an output end 120 of the tube by an end-cap 152, and an optical axis 122 that extends through the center of the input mirror and the center of the output mirror. The tube 112 and end-caps 150, 152 form the cell of the optical cavity 104. The tube 112 is configured to receive the medium sample 132 through an input valve 134 associated with the output end 120 of the tube, and to discharge the medium sample 132 through an output valve 136 associated with the input end 116 of the tube.

The coupling device 106 is configured to couple the laser beam 110 through the input mirror 114 into the tube 112 as one of a single narrow-diameter laser beam 124 or a large-diameter laser beam 126. In one configuration, the optical cavity 104 is high-reflective over a narrow spectral range, e.g., 1560-1650 nm. The detector 108 is optically coupled with the optical cavity 104, and is configured to detect an intensity of light 128 of the wavelength corresponding to the absorption region of interest that extends through the output mirror 118. In one configuration, the detector 108 is optically coupled with the optical cavity 104 through a bandpass filter 138 and a lens 140. The bandpass filter 138 blocks light that is outside the spectral range of the optical cavity 104 and thus mitigates stray noise and non-lasing light (broadband emission from the laser). The lens 140 focuses the light transmitted through the optical cavity 104 onto the detector 108.

Having generally described an optical system 100 having an optical cavity 104 with a cell configured in accordance with embodiments disclosed herein, embodiments of the optical cavity 104 and the cell are now described in detail.

Closed Cell/Optical Cavity

With reference to FIGS. 2-6, an optical cavity 200 in accordance with embodiments disclosed herein includes a cell 250, a first mirror 214 at a first end of the cell, and a second mirror 218 at a second end of the cell. The first mirror 214 and the second mirror 218 are highly reflective mirrors having a reflectivity of, for example, greater than 90%. The cell 250 includes a tube 212, a first end-cap 302 at a first end of the tube and a second end-cap 304 at a second end of the tube. The tube 212 has a first open-end 216 and a second open-end 220. The tube may be pre-formed, e.g., extruded, roll-wrapped, seam welded. The tube 212 may be made of varied materials, including for example, metal (e.g., aluminum, steel, Invar, Inconel), composites (e.g., carbon fiber, kevlar), glass and ceramics (e.g., Zerodur) or Teflon.

The first end-cap 302 is fixedly attached at the first open-end 216 and has an opening 306 with a center axis 310. The second end-cap 304 is fixedly attached at the second open-end 220 and has an opening 308 with a center axis 312 that is optically aligned with the center axis 310 of the first end-cap 302. The end-caps 302, 304 may be made of varied materials such as metals, glass, ceramic, Teflon or plastics (e.g., Delrin). The end-caps 302, 304 may be machined or 3D printed. As described further below with reference to FIG. 7, the end-caps 302, 304 are aligned relative to each other using optical alignment methods (instead of machine tolerances) and then permanently attached to the tube 212 using adhesive.

The first mirror 214 is removably coupled with the first end-cap 302 by a first mirror clamp assembly 314 such that when the first mirror 214 is coupled to the first end-cap 302, the center 318 of the first mirror is axially aligned with the center axis 310 of the first end-cap. The first end-cap 302 includes a mirror-landing surface 322 and the first mirror clamp assembly 314 includes a first body 324 having an opening 326 configured to removably receive the first mirror 214. The first body 324 is configured to be coupled to the first end-cap 302 to secure the first mirror 214 adjacent to the mirror-landing surface 322 of the first end-cap 302. In some embodiments, a sealing o-ring 328 is positioned between the first mirror 214 and the mirror-landing surface 322.

The first mirror clamp assembly 314 includes a centering o-ring 330. The centering o-ring positions the first mirror 214 in the opening 326 of the first body 324. In some embodiments the first body 324 of the first mirror clamp assembly 314 includes an inward-projecting feature 332 and a compression o-ring 334 that is positioned between the inward-projecting feature 332 and the centering o-ring 330. The compression o-ring 334 has a hardness greater than the sealing o-ring 328. The first mirror 214 is secured in place adjacent to the mirror-landing surface 322 of the first end-cap 302 using attachment bolts 356 that extend through holes 358 in the first body 324 to couple with holes 360 formed in the first end-cap. Tightening of the attachment bolts 356 within the holes 360 secures the first mirror 214 in place by compression forces.

Figure 3:
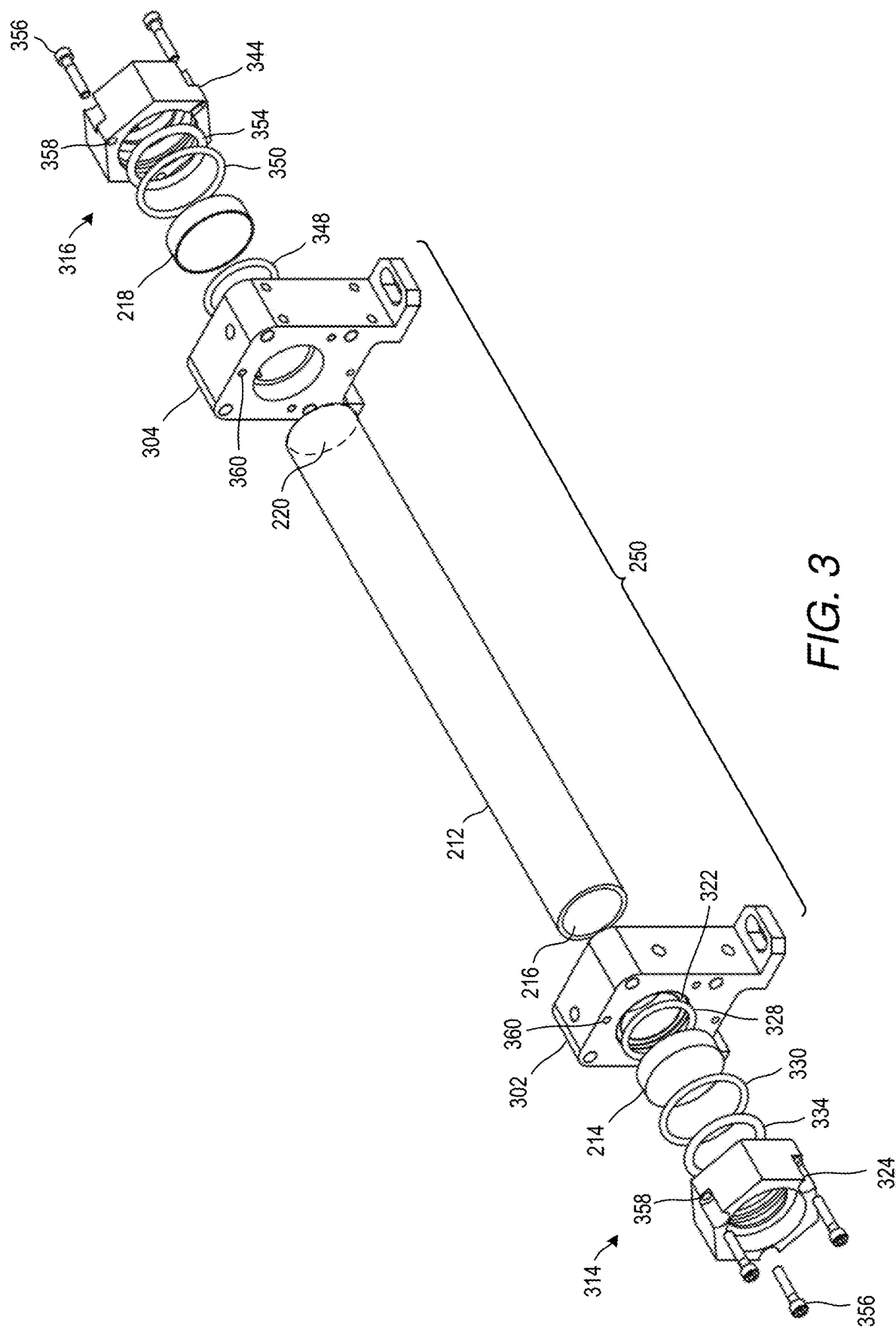
FIG. 3 is an exploded perspective illustration of the optical cavity of FIG. 2.

In the embodiment of FIG. 3, the first mirror clamp assembly 314 includes three attachment bolts 356 and three corresponding holes 358 that are evenly spaced apart around the first body 324 to align with respective holes 360 in the first end-cap 302. Respective diameters of the attachment bolts 356 and holes 358, 360 are within a tight tolerance of each other to restrain lateral movement and transverse movement of the first mirror 214 relative to the first end-cap 302 during assembly and reassembly (e.g., after mirror cleaning or replacement). The tight tolerances of the attachment bolts 356 and holes 358, 360 function to securely place the first mirror 214 within the first end-cap 302 such that: 1) the optical axis of the first mirror 214 is aligned with the optical axis of the second end-cap 304 and the second mirror 218, and 2) the first mirror 214 in place adjacent to the mirror-landing surface 322 of the first end-cap to preserve the lateral location of the first mirror relative to the second end-cap and the second mirror. In another embodiment, the attachment bolts 356 and holes 360 may be configured to further restrain the lateral movement and transverse movement of the first mirror 214 relative to the first end-cap 302. For example, the attachment bolts 356 and holes 360 may have conical or hemispherical configuration to enforce centering of the bolt within the hole during tightening.

The second mirror 218 is removably coupled with the second end-cap 304 by a second mirror clamp assembly 316 such that when the second mirror 218 is coupled to the second end-cap 304, the center 320 of the second mirror is axially aligned with the center axis 312 of the second end-cap. The second end-cap 304 includes a mirror-landing surface 342 (that is parallel to the mirror-landing surface 322 of the first end-cap 302) and the second mirror clamp assembly 316 includes a second body 344 having an opening 346 configured to removably receive the second mirror 218. The second body 344 is configured to be coupled to the second end-cap 304 to secure the second mirror 218 adjacent to the mirror-landing surface 342 of the second end-cap 304. In some embodiments a sealing o-ring 348 is positioned between the second mirror 218 and the mirror-landing surface 342.

The second mirror clamp assembly 316 includes a centering o-ring 350. The centering o-ring positions the second mirror 218 in the opening 326 of the second body 344. In some embodiments the second mirror clamp assembly 316 includes an inward-projecting feature 352 and a compression o-ring 354 that is positioned between the inward-projecting feature 352 and the centering o-ring 350. The compression o-ring 354 has a hardness greater than the sealing o-ring 348. The second mirror 218 is secured in place adjacent to the mirror-landing surface 342 of the second end-cap 304 using attachment bolts 356 that extend through holes 358 in the second body 344 to couple with holes 360 formed in the second end-cap. Tightening of the attachment bolts 356 within the holes 360 secures the second mirror 218 in place by compression forces.

In the embodiment of FIG. 3, the second mirror clamp assembly 316 includes three attachment bolts 356 and three corresponding holes 358 that are evenly spaced apart around the second body 344 to align with respective holes 360 in the second end-cap 304. Respective diameters of the attachment bolts 356 and holes 358, 360 are within a tight tolerance of each other to restrain lateral movement and transverse movement of the second mirror 218 relative to the second end-cap 304 during assembly and reassembly (e.g., after mirror cleaning or replacement). The tight tolerances of the attachment bolts 356 and holes 358, 360 function to securely place the second mirror 218 within the second end-cap 304 such that: 1) the optical axis of the second mirror 218 is aligned with the optical axis of the first end-cap 302 and the first mirror 214, and 2) the second mirror 218 in place adjacent to the mirror-landing surface 342 of the second end-cap to preserve the lateral location of the second mirror relative to the first end-cap and the first mirror. In another embodiment, the attachment bolts 356 and holes 360 may be configured to further restrain the lateral movement and transverse movement of the second mirror 218 relative to the second end-cap 304. For example, the attachment bolts 356 and holes 360 may have conical or hemispherical configuration to enforce centering of the bolt within the hole during tightening.

The mirrors 214, 218 are thus removably placeable within the end-caps 302, 304 such that repeatable transverse alignment (i.e., optical axis alignment) of the mirrors 214, 218 is established, together with repeatable lateral placement (i.e., the distance between the mirrors 214, 218). In other words, the respective configuration of the end-caps 302, 304 and the mirror clamp assemblies 314, 316 ensure that when a mirror 214, 218 is removed for cleaning or replacement, the mirror that is installed, e.g., either the same mirror after cleaning or a different mirror, is held in place within its respective end-cap 302, 304 in a manner that preserves both optical alignment and lateral spacing of the mirrors 214, 218.

Closed Cell Assembly Process

Figure 5:
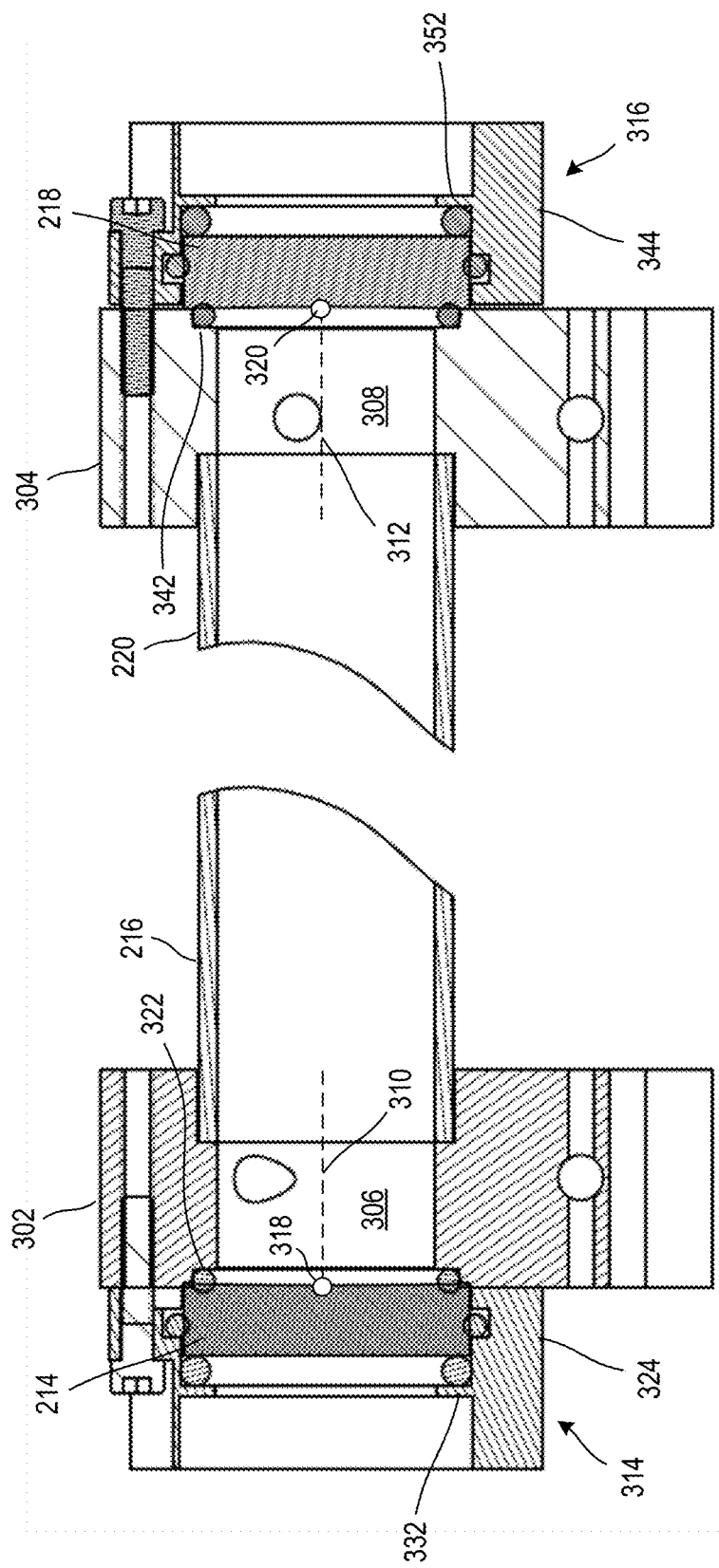
FIG. 5 is a side-view, cross-section illustration of the optical cavity of FIG. 2.
Figure 6:
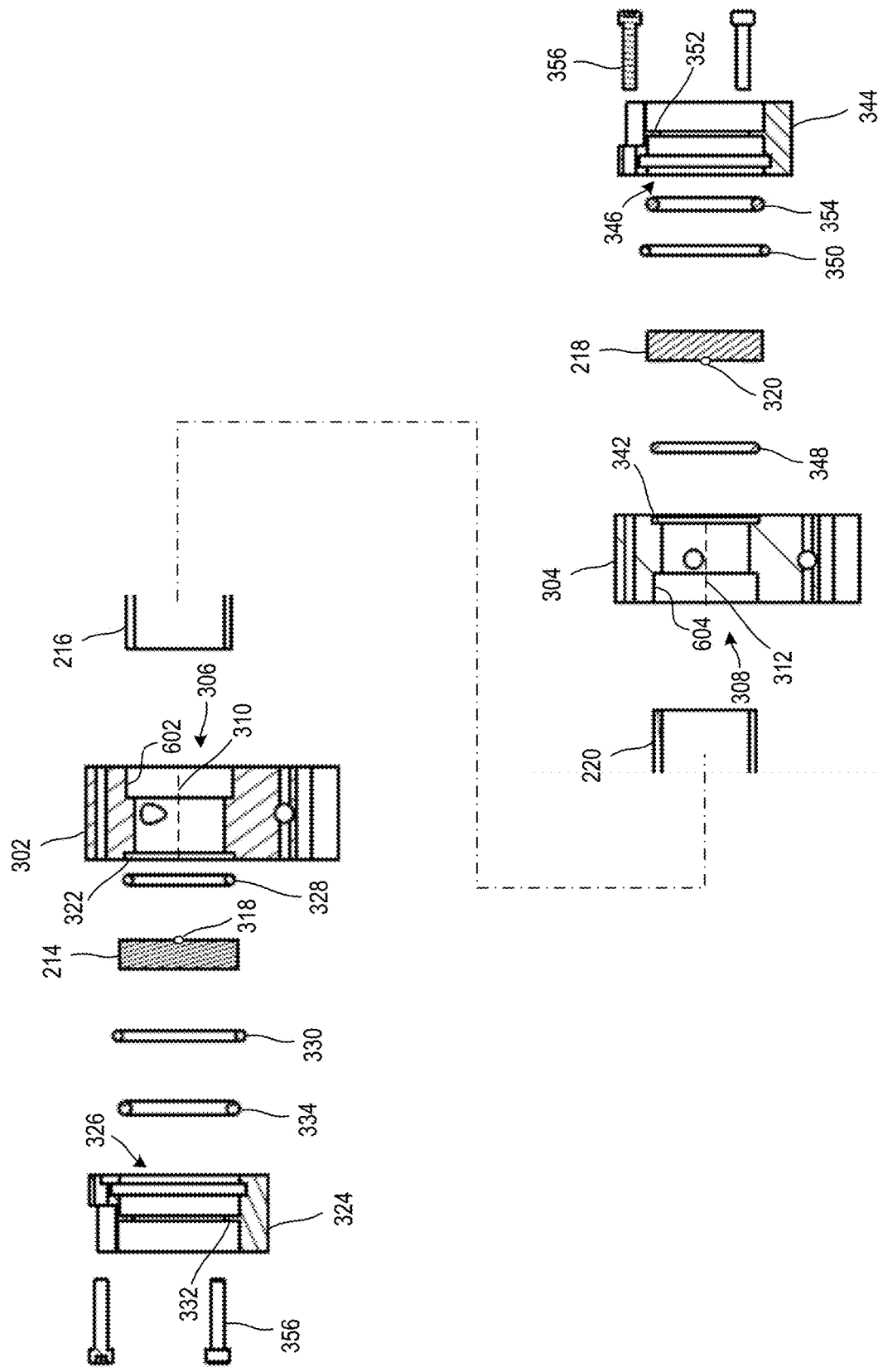
FIG. 6 is an exploded side-view, cross-section illustration of the optical cavity of FIG. 2.
Figure 7:
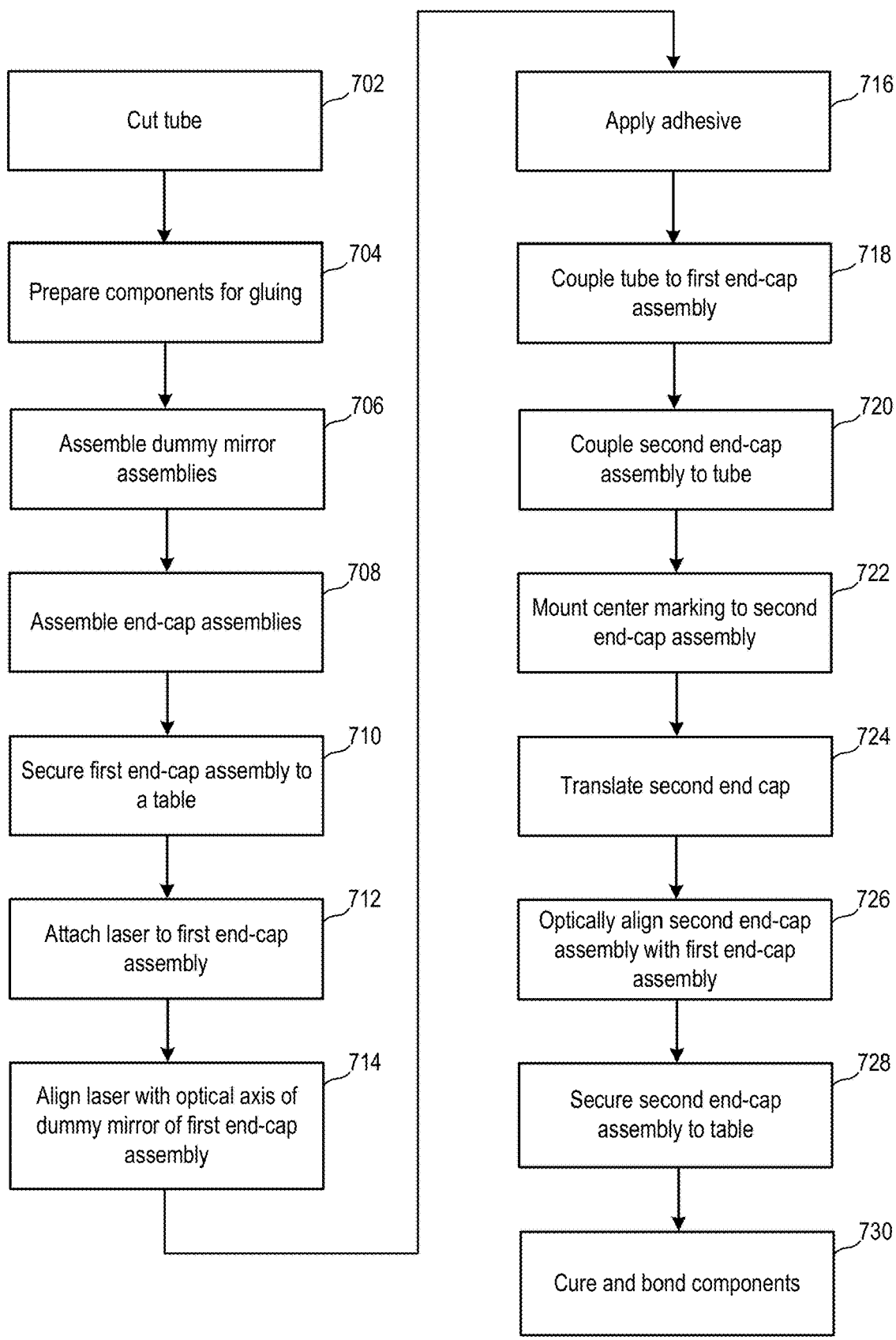
FIG. 7 is a detailed flowchart of a method of assembling a closed cell of an optical cavity FIGS. 2 and 3 in accordance with embodiments disclosed herein.

FIG. 7 is a detailed flowchart of a method of assembling an optical cavity, such as the one shown in FIGS. 2-6.

Figure 4:
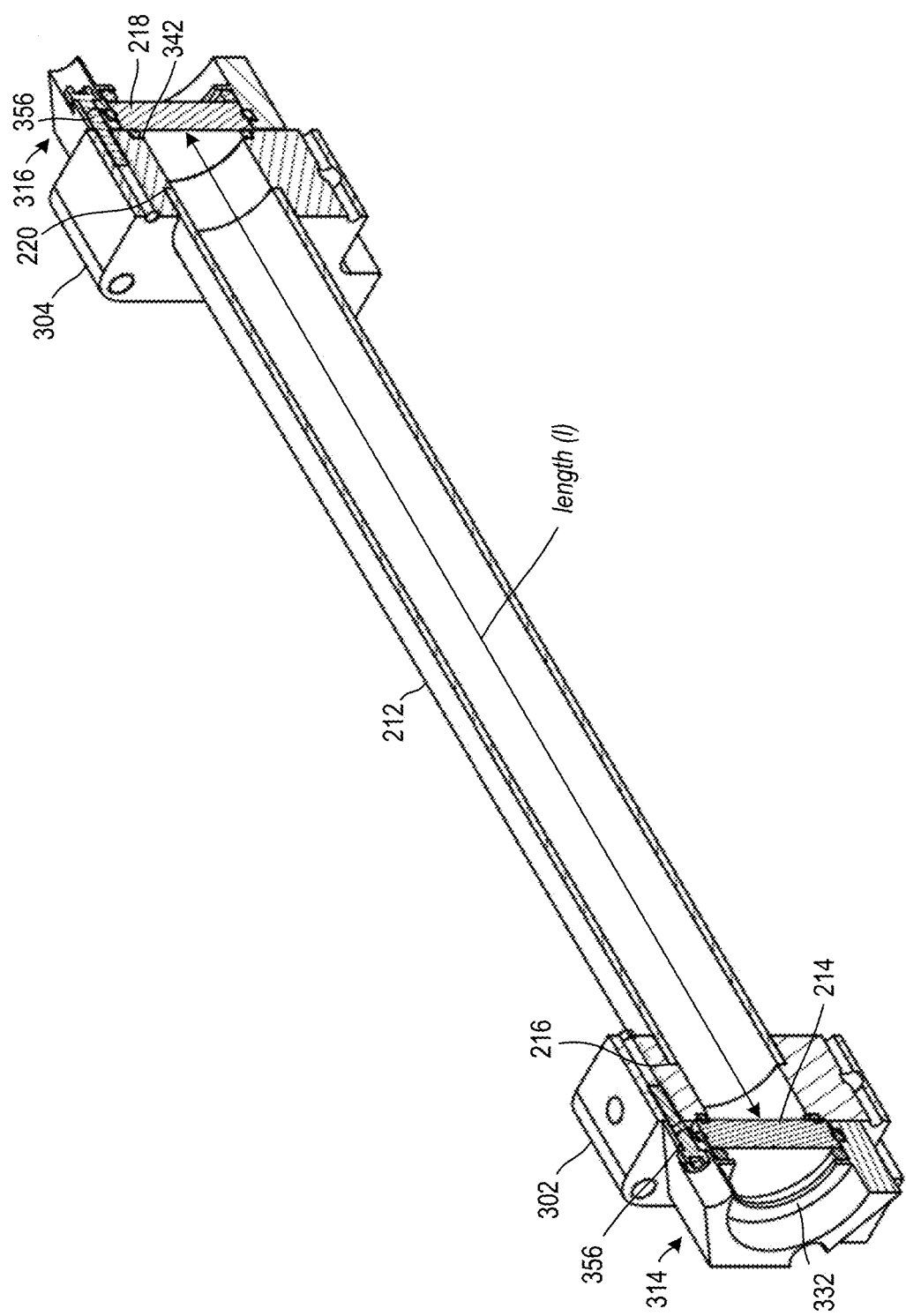
FIG. 4 is a cross-section illustration of the optical cavity of FIG. 2.

At block 702, a tube 212 is cut to a length corresponding to the desired optical cavity length. With reference to FIG. 4, the optical cavity length/is the distance between the center of the first mirror 214 and the center of the second mirror 218. An optical cavity 200 assembled in accordance with the method of FIG. 7 may have a length between 1 centimeter and 10 meters. In one example, for an optical cavity 200 having a length of 28 cm (11.02 in), the corresponding length for the tube 212 is 25.46 cm (10.02 in), with the offset from each open-end 216, 220 of the tube to the surface of its respective mirror 214, 218 being 1.27 cm for a total of 2.54 cm (1 in). The tube 212 may be cut using an end mill and the diamond coated mill. The tube 212 may be a carbon fiber tube.

At block 704, and with reference to FIGS. 4-6, components of the optical cavity 200 are prepared for gluing. To this end, the open-ends 216, 220 of the tube 212 are deburred with 150 grit sand paper. A portion, e.g., the last 0.64 cm (0.25 in), of each open-end 216, 220 of the tube 212 is roughened to improve adhesion. With reference to FIG. 6, interior surfaces 602, 604 of the first end-cap 302 and the second end-cap 304 are roughened with 150 grit sand paper. The tube 212 and the end-caps 302, 304 are cleaned and dried. For example, the components 212, 302, 304 are cleaned with a liquid soap and hot water and rinsed. Each component 212, 302, 304 is then cleaned and sonicated with isopropyl alcohol, and then baked at 150 F for 30 min to dry.

Figure 8A:
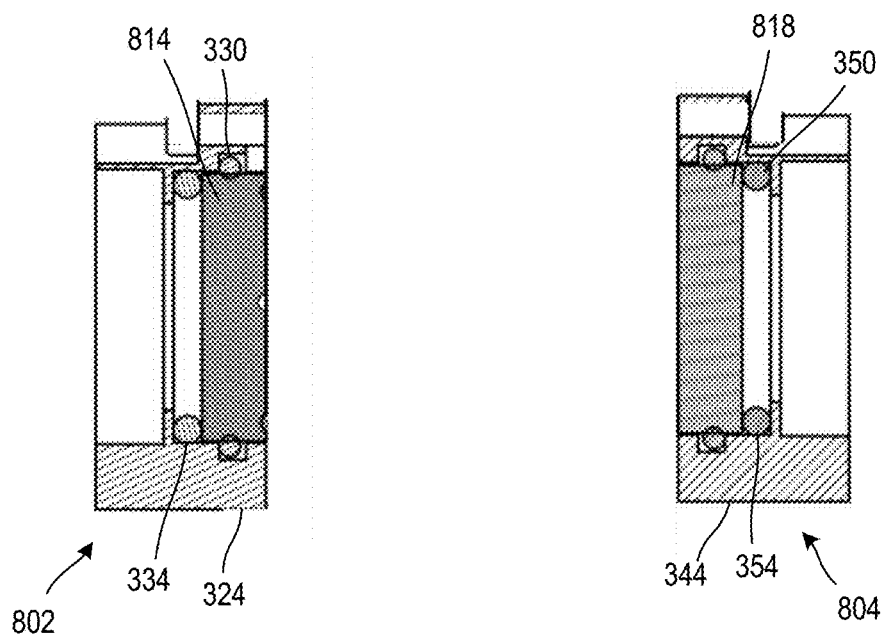

At block 706, and with reference to FIG. 8A, dummy mirror assemblies 802, 804 are assembled using partially reflective mirrors 814, 818 instead of highly reflective mirrors 214, 218. The partially reflective mirrors 814, 818 enable visibility of multiple reflections of light. For example, the partially reflective mirrors 814, 818 may have a reflectivity of about 50%. To this end, a first partially reflective mirror 814 is placed in a first body 324 together with a compression o-ring 334 and a centering o-ring 330 to form a first dummy mirror assembly 802. A second partially reflective mirror 818 is placed a second body 344 together with a compression o-ring 354 and a centering o-ring 350 to form a second dummy mirror assembly 804.

Figure 8B:
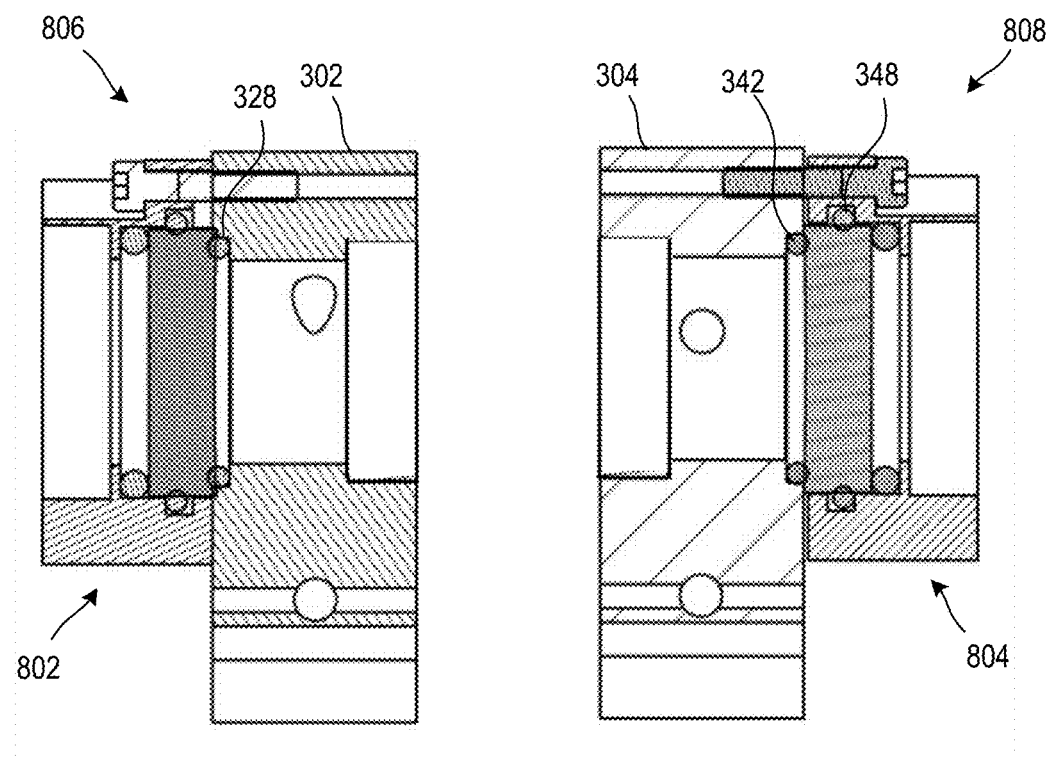

At block 708, and with reference to FIG. 8B, two end-cap assemblies 806, 808 are assembled. To this end, the first dummy mirror assembly 802 is attached to a first end-cap 302 together with a sealing o-ring 328 to form a first end-cap assembly 806. The second dummy mirror assembly 804 is attached to a second end-cap 304 together with a sealing o-ring 348 to form a second end-cap assembly 808. The two end-cap assemblies 806, 808 make a complete, rigid and repeatable mirror plus end-cap assembly.

Figure 8C:
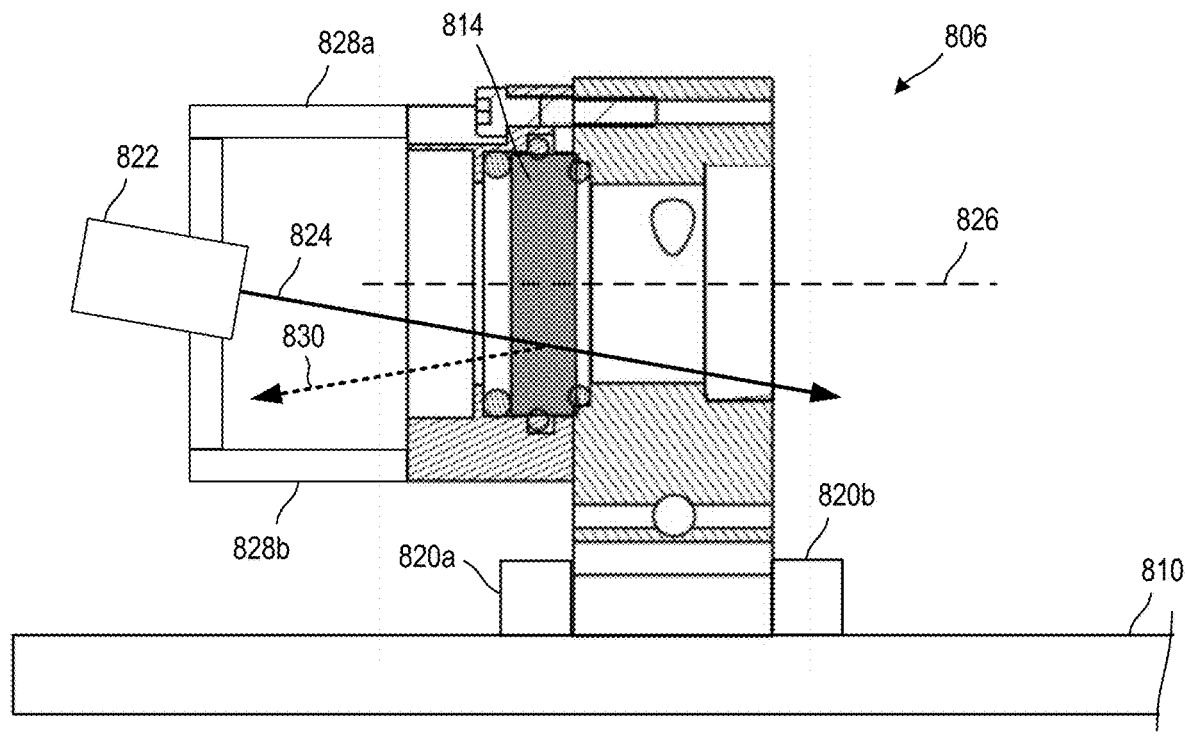

At block 710, and with reference to FIG. 8C, the first end-cap assembly 806 is secured to a table 810 using clamps 820a, 820b.

At block 712, and with continued reference to FIG. 8C, a laser source 822 is aligned relative to the first partially reflective mirror 814 such that transverse movement (up/down movement in FIG. 8C) of the laser beam 824 falls on the optical axis 826 of the first partially reflective mirror 814, where the optical axis is the axis normal to the surfaces of the first partially reflective mirror. To this end, the laser source 822 can be attached to the first end-cap assembly 806 using mechanical rods 828a, 828b. In FIG. 8C, the laser source 822 is positioned such that the retro-reflected laser 830 is not aligned with the optical axis 826.

Figure 8D:
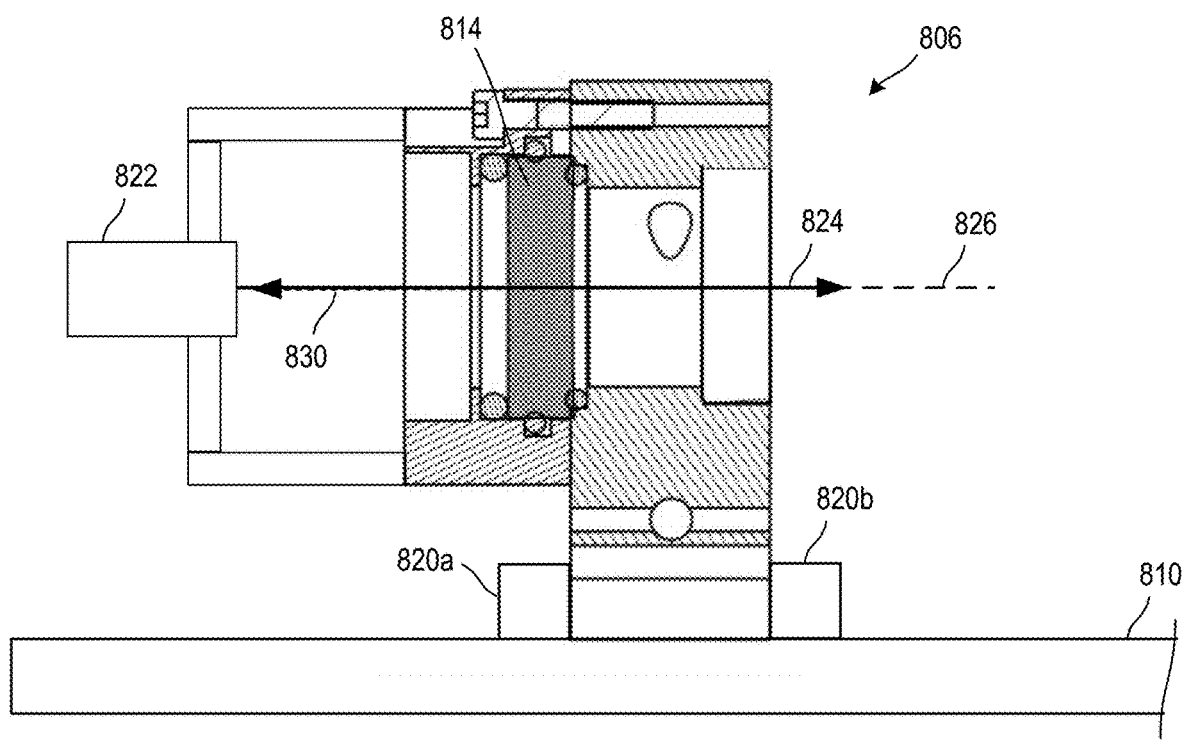

At block 714, and with reference to FIG. 8D, the position of the laser source 822 is adjusted until the retro-reflected laser 830 is aligned such that the laser beam 824 is aimed along the optical axis 826 of the first partially reflective mirror 814.

At block 716, and with reference to FIG. 8E, adhesive is applied to the first open-end 216 the tube 212 and the second open-end 220 of the tube.

At block 718, and with reference to FIG. 8F, the first open-end 216 of the tube 212 is mechanically coupled to the first end-cap assembly 806. To this end, the first open-end 216 of the tube 212 is inserted into the opening 306 of first end-cap assembly 806. The tube 212 is spun to distribute the adhesive uniformly around and between the outer surface of the first open-end 216 of the tube 212 and the interior surface of the first end-cap 302. At this stage, the second open-end 220 of the tube 212 is supported by hand in free space.

Figure 8G:
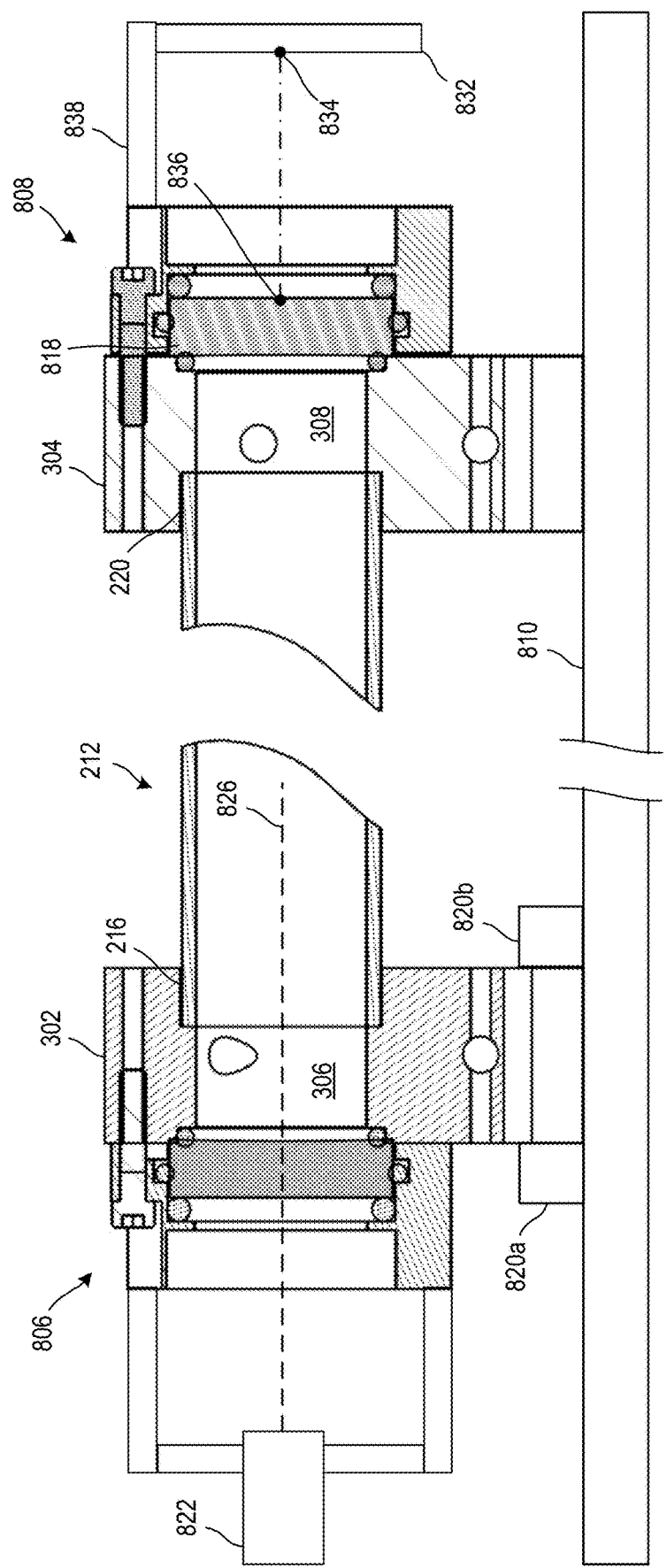

At block 720, and with reference to FIG. 8G, the second end-cap assembly 808 is coupled to the tube 212. To this end, the second end-cap assembly 808 is placed relative to the tube 212 such that the second open-end 220 of the tube is received by the opening 308 of the second end-cap assembly. The tube 212 is spun to distribute the adhesive uniformly around and between the outer surface of the second open-end 220 of tube and the interior surface of the second end-cap 304.

At block 722, and with continued reference to FIG. 8G, a marker 832 is aligned relative to the second end-cap assembly 808 such that an iris/aperture/center 834 of the marker coincides with the mechanical center 836 of the second partially reflective mirror 818. For example, the marker 832 may be mechanically mounted to rods 838 that screw into the second end-cap 304.

Figure 8H:
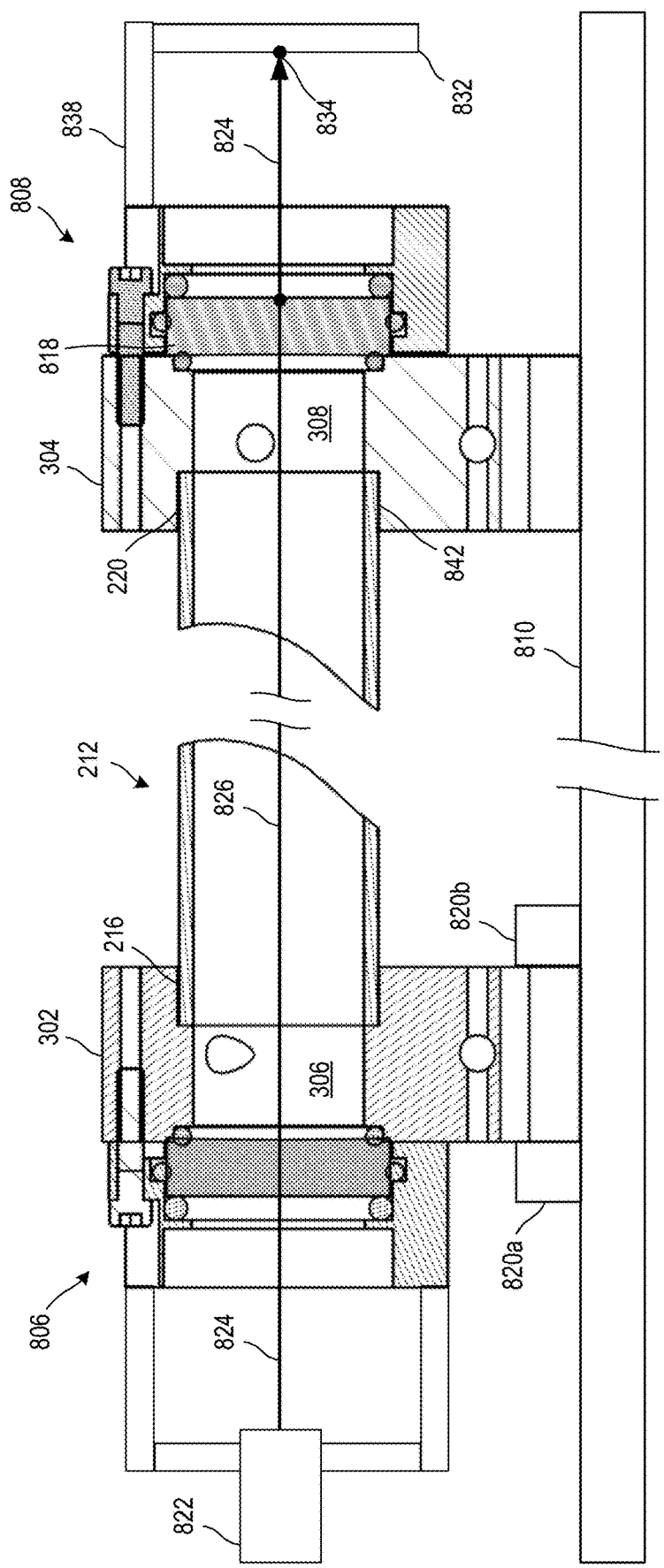

At block 724, and with reference to FIG. 8H, the second end-cap assembly 808, which is not mounted to the table 810, is centered on the optical axis 826. To this end, an alignment laser beam 824 is output by the laser source 822 and the second end-cap assembly 808 is translated transverse (e.g., up/down, side-to-side) to the optical axis 826 and relative to the second open-end 220 of the tube 212 to center the alignment laser beam 824 on the center 834 of the marker. It is noted that translation of the second end-cap assembly 808 relative to the second open-end 220 of the tube 212 is possible because the adhesive at the second open-end 220 of the tube 212 has not yet cured. Furthermore, while not apparent in FIG. 8H, a space or gap 842 separates the outer surface of the tube 212 and the inner wall of the second end-cap 304. This gap 842 is filled with uncured adhesive at this stage of the assembly process and thus allows for translation of the second end cap. For example, a gap 842 between the outer surface of the tube 212 and the inner wall of second end-cap 304 of 0.00508 cm (0.002 in) to 0.127 cm (0.05 in) allows for the required translational (i.e., transverse movement) and tip/tilt (i.e., angular movement) operations.

Figure 8I:
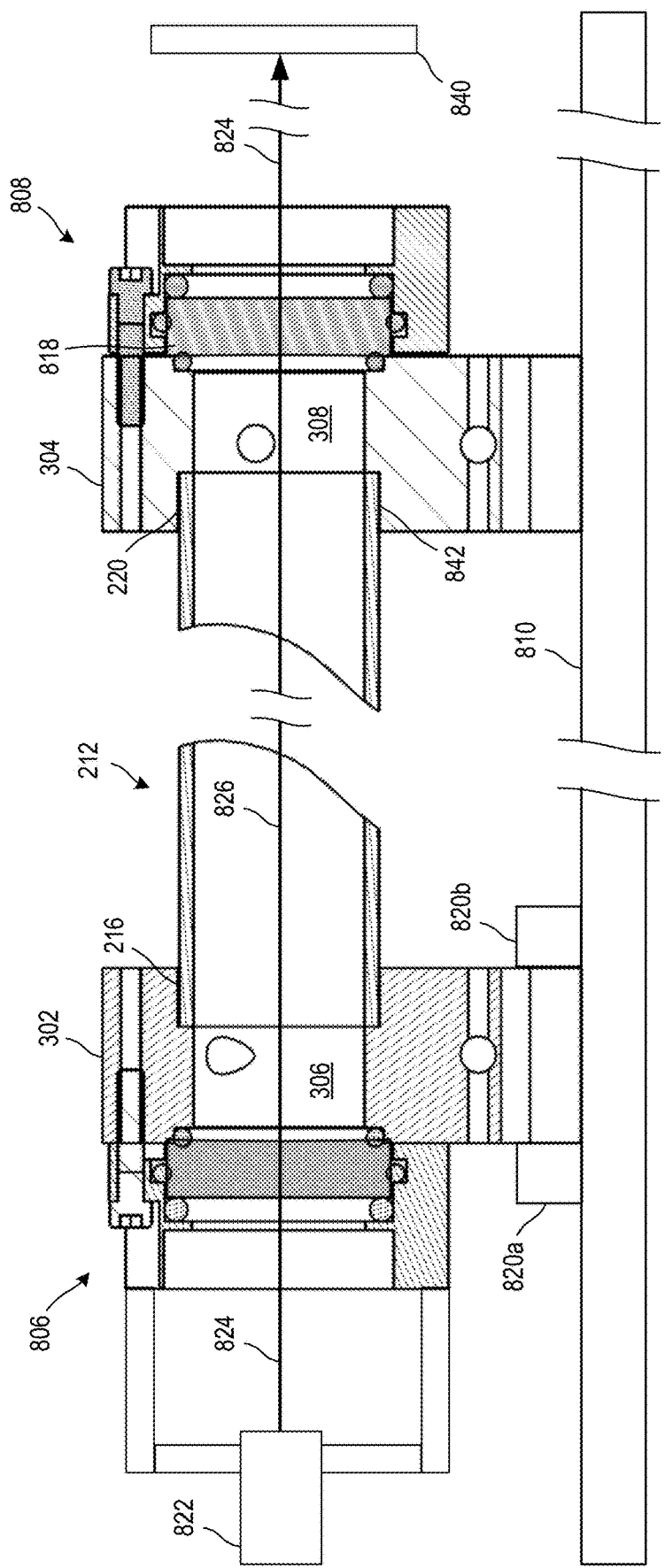

At block 726, and with reference to FIG. 8I, the second end-cap assembly 808 is optically aligned with the first end-cap assembly 806. To this end, the laser source 822 attached to the first end-cap assembly 806 outputs a laser beam 824 toward the second end-cap assembly 808. Multiple reflections of the laser beam 824 between the first partially reflective mirror 814 of the first end-cap assembly 806 and the second partially reflective mirror 818 of the second end-cap assembly 808 are observed on a screen 840 placed about 1 m away from the second end-cap assembly. The angle (or tip/tilt) of the second end-cap assembly 808 is adjusted to achieve alignment of the multiple reflections. While not apparent in FIG. 8I, the gap 842 between the outer surface of the tube 212 and the inner wall of the second end-cap 304 allows for angular adjustment of the second end cap. Again, this gap 842 is filled with uncured adhesive at this stage of the assembly process.

Figure 9B:
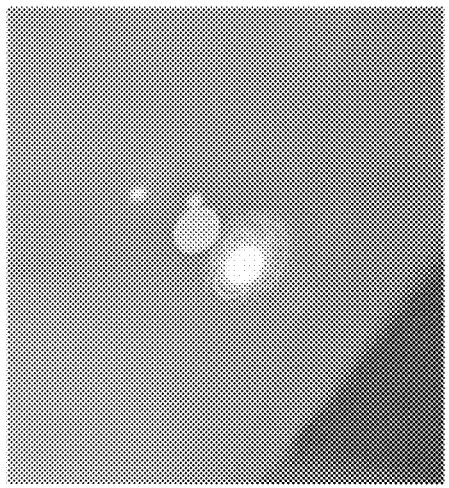
FIG. 9B is an image of a spot pattern resulting from the alignment of FIG. 9A.
Figure 9D:
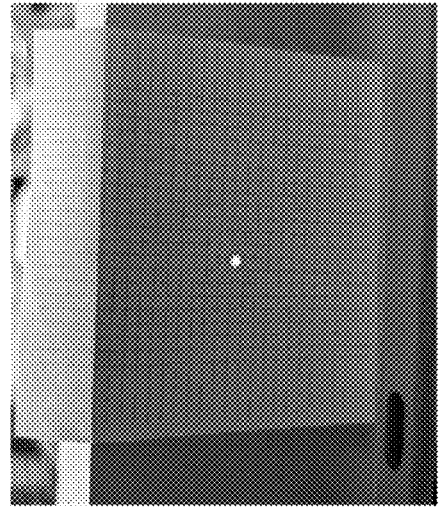
FIG. 9D is an image of a spot pattern resulting from the alignment of FIG. 9A.
Figure 9A:
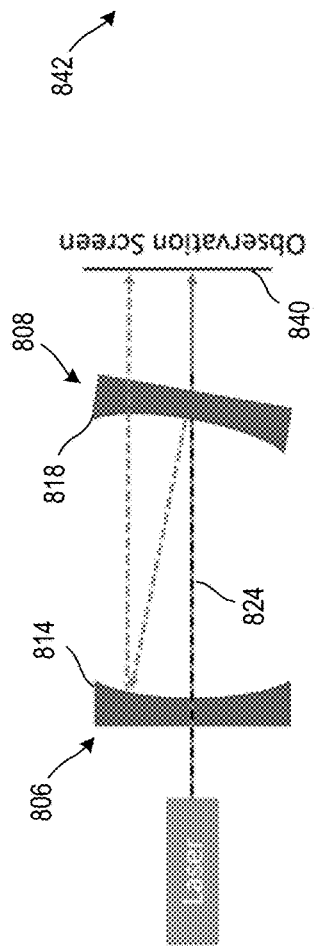
FIG. 9A is a schematic illustration of an alignment step of the method of FIG. 7.
Figure 9C:
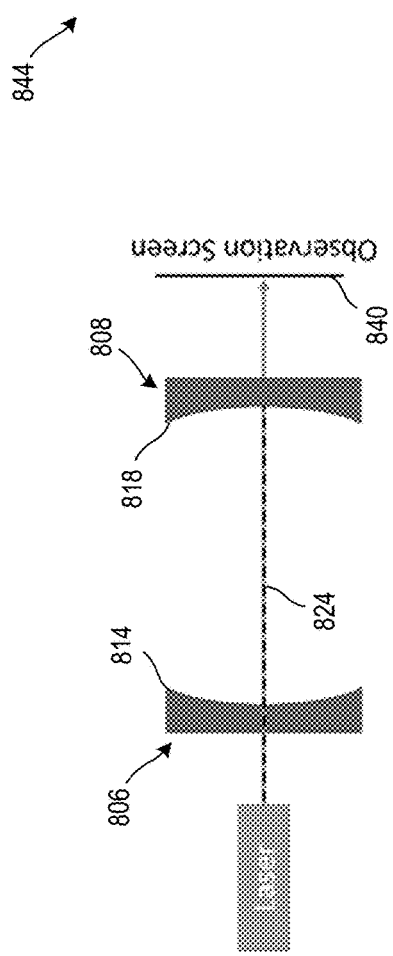
FIG. 9C is a schematic illustration of an alignment step of the method of FIG. 7.

With reference to FIGS. 9A and 9B, when the second end-cap assembly 808 is not optically aligned with the first end-cap assembly 806, multiple reflections of the laser beam 824 between the first partially reflective mirror 814 and the second partially reflective mirror 818 appear on a screen 840 as separate spots of light. With reference to FIGS. 9C and 9D, when the second end-cap assembly 808 is optically aligned with the first end-cap assembly 806, multiple reflections of the laser beam 824 between the first partially reflective mirror 814 and the second partially reflective mirror 818 overlap and appear on a screen 840 as a single spot of light.

At block 728, after the second end-cap assembly 808 is optically aligned with the first end-cap assembly 806, the second end-cap assembly 808 is secured to the table 810 to maintain the spot overlap shown in FIG. 9D.

At block 730, the assembled optical cavity is cured and bonded. To this end, the adhered components of the cavity are cured for 12-24 hours. After curing, the optical cavity is inspected for any movement of components and unclamped from the table 810. The optical cavity is then oven cure at 150 F for 60 min to maximize bond strength.

After curing is completed, the first dummy mirror assembly 802 is decoupled from the first end-cap 302 and the second dummy mirror assembly 804 is decoupled from the second end-cap 304 to provide a cell 250 having end-caps that are optically aligned and permanently attached to opposite ends of the tube such that respective mirror-landing surfaces of the end-caps are substantially parallel.

Figure 10:
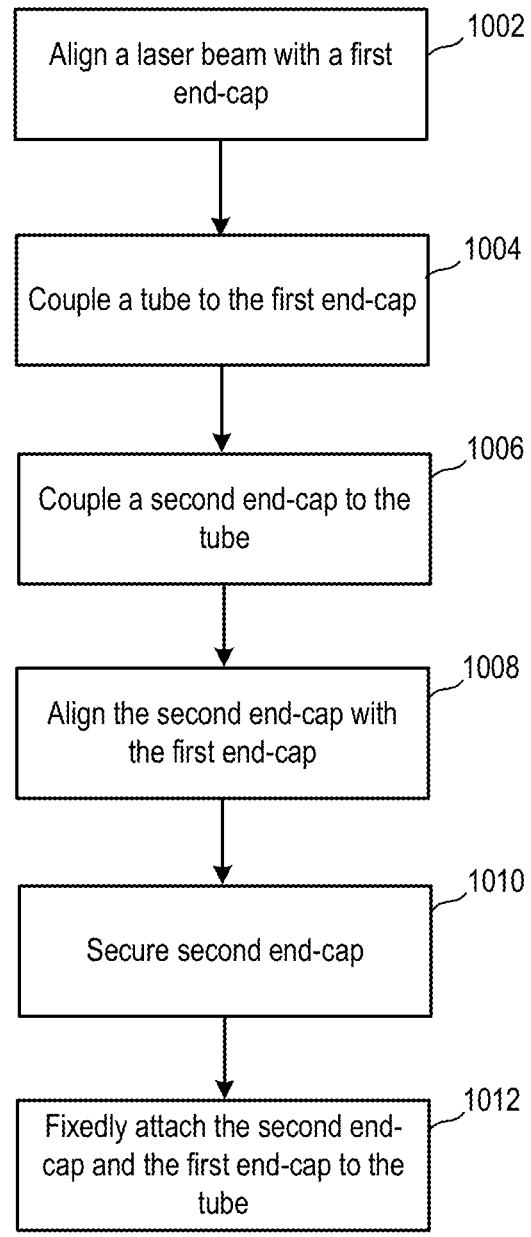
FIG. 10 is a general flowchart of a method of assembling a closed cell of an optical cavity in accordance with embodiments disclosed herein.

With reference to FIG. 10, a general method of assembling a cell for an optical cavity in accordance with embodiments disclosed herein includes:

At block 1002, a laser beam is aligned with a first end-cap. To this end the laser beam is aligned with an optical axis of a first mirror that is secured in a first end-cap, which is secured in place relative to a surface. As part of this alignment process, a source of the laser beam is attached to the first end-cap, and the alignment of the source is adjusted relative to the first mirror such that transverse movement of the laser beam falls on the optical axis 826 of the first mirror.

At block 1004, a first open-end of a tube is coupled to the first end-cap. To this end, adhesive is applied to the first open-end and the first open-end is inserted into an opening of the first end-cap.

At block 1006, a second end-cap is coupled to a second open-end of the tube. To this end, adhesive is applied to the second open-end and the opening of the second end-cap is placed over the second open-end of the tube.

At block 1008, the second end-cap is optically aligned with the first end-cap. To this end, a laser beam is directed from the source toward a second mirror secured in the second end-cap. And the second end-cap is translated until an alignment of multiple reflections of the laser beam between the first mirror and the second mirror is obtained. For example, an alignment of multiple reflections of the laser beam between the first mirror and the second mirror may be observed as a single spot of light in a spot pattern.

At block 1010, the second end-cap is secured in place relative to the surface.

At block 1012, the first open end of the tube is fixedly secured to the first end-cap and the second open end of the tube is fixedly secured to the second end-cap. To this end, an adhesive between the first open-end of the tube and the first end-cap is cured, and an adhesive between the second open-end of the tube and the second end-cap is cured. The adhesive may be the adhesive applied in blocks 1004 and 1006.

The closed-cell optical cavity and method of assembly disclosed herein have the following numerous advantages.

The end-caps 302, 304 are optically pre-aligned and permanently affixed (or fixedly attached) to the tube during assembly. Additionally, because the end-cap-to-end-cap (or, equivalently, mirror-to-mirror) alignment is achieved with a laser beam prior to complete adhesion, the alignment can be more accurate than machined cells. The metal-glass interface between the mirrors 214, 218 and the end-caps 302, 304 of the optical cavity 200 allows for repeated removal and insertion of the mirrors (e.g., for cleaning) while maintaining end-cap-to-end-cap (or, equivalently, mirror-to-mirror) optical alignment. The metal-glass interface between the mirrors 214, 218 and the end-caps 302, 304 provides an optical cavity 200 that is robust to shock, vibration, and thermal fluctuations.

The component cost of the optical cavity 200 is reduced relative to the approaches mentioned in the background of this disclosure because the size of the machined object is reduced, the tolerances may be relaxed, and the long bore step is eliminated. An optical cavity 200 of much longer length can be fabricated while meeting the strictest face parallelism requirements of multi-pass and cavity enhanced absorption spectroscopies.

The weight of the optical cavity 200 is reduced relative to the approaches mentioned in the background of this disclosure because components of the optical cavity, such as the tube 212, can be made from alternative materials (e.g., carbon fiber). The temperature sensitivity of the optical cavity 200 can be reduced components of the optical cavity, such as the tube 212, can be made from low thermal coefficient of expansion materials.

Note that while the foregoing describes the cell as a closed cell configured to contain a sample under test in the space between mirrors at the ends of the cell, the closed cell may be converted to an open cell by forming one or more openings through the wall of the tube.

Open Cell/Optical Cavity

Figure 11:
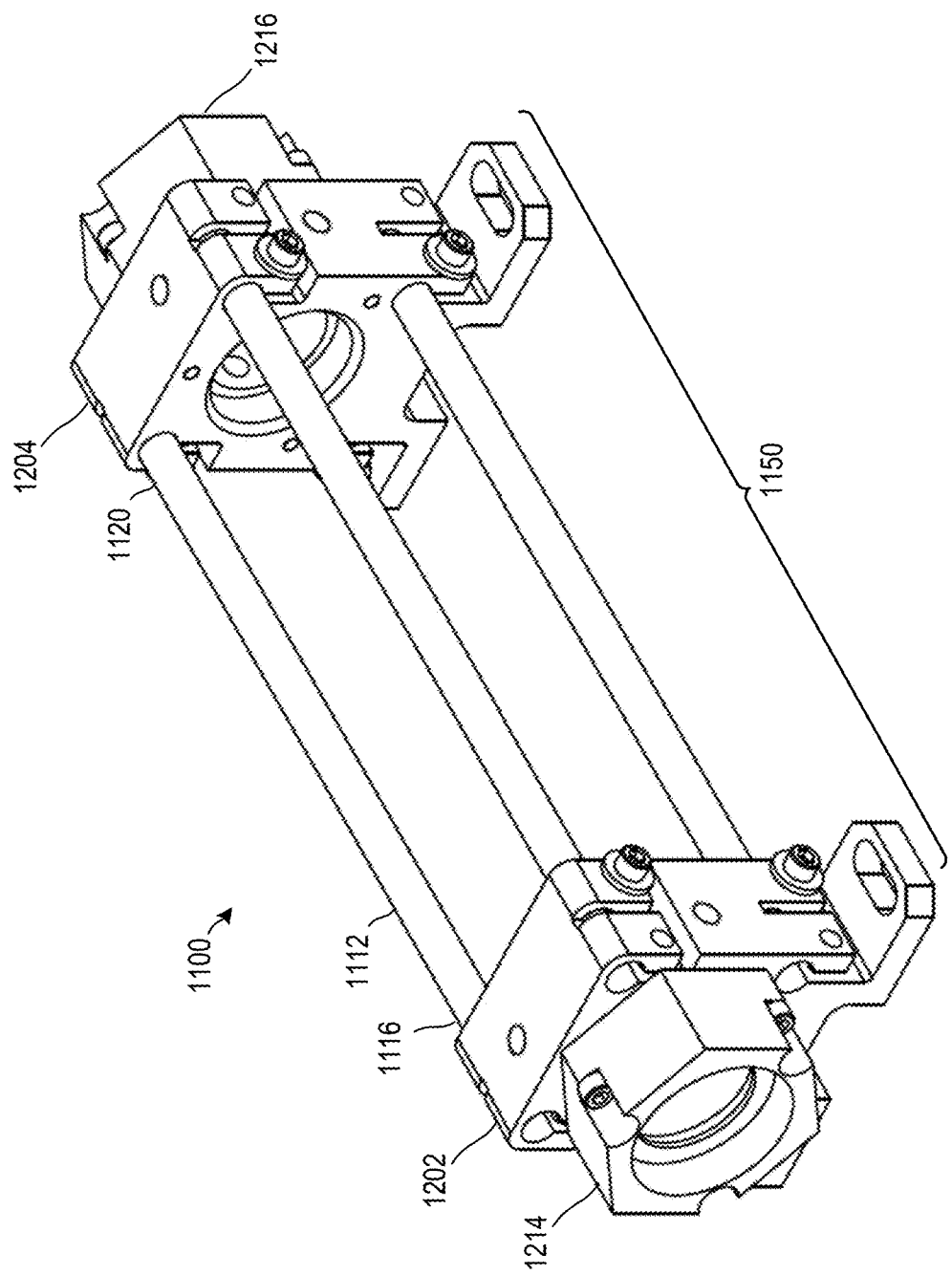
FIG. 11 is a perspective illustration of an optical cavity in accordance with embodiments disclosed herein.
Figure 12:
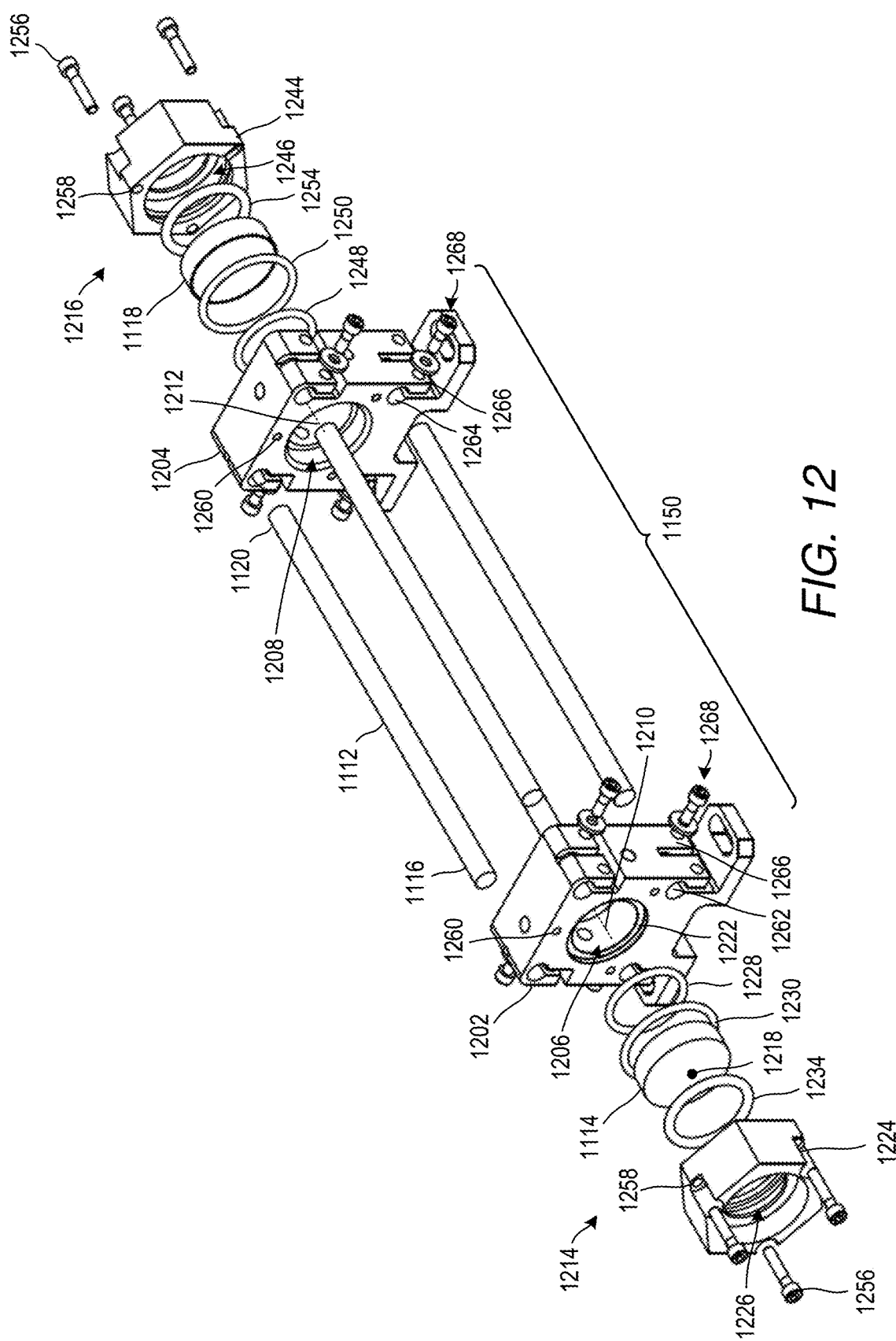
FIG. 12 is an exploded perspective illustration of the optical cavity of FIG. 11.

With reference to FIGS. 11 and 12, an optical cavity 1100 in accordance with embodiments disclosed herein includes an open cell 1150, a first mirror 1114 at a first end of the open cell, and a second mirror 1118 at a second end of the open cell. The first mirror 1114 and the second mirror 1118 are highly reflective mirrors having a reflectivity of, for example, greater than 90%. The open cell 1150 includes at least one structure 1112, a first end-cap 1202 at a first end of the structure and a second end-cap 1204 at a second end of the structure. In the example embodiment of FIGS. 11 and 12 the open cell 1150 includes four structures 1112. In other embodiments, more or less than four structures 1112 may be included. The structure 1112 may be a solid rod or a rail or a tube. The structure 1112 may be pre-formed, e.g., extruded, roll-wrapped, seam welded. The structure 1112 may be made of varied materials, including for example, metal (e.g., aluminum, steel, Invar, Inconel), composites (e.g., carbon fiber, kevlar), glass and ceramics (e.g., Zerodur) or Teflon.

The first end-cap 1202 is attached at the first end 1116 of each structure 1112 and has an opening 1206 with a center axis 1210. The first end-cap 1202 includes a number of first receptacles 1262 configured to receive a corresponding first end 1116 of a structure 1112. A clamp 1266 and clamping hardware 1268 is associated with each first receptacle 1262.

The second end-cap 1204 is attached at the second end 1120 of each structure 1112 and has an opening 1208 with a center axis 1212 that is optically aligned with the center axis 1210 of the first end-cap 1202. The second end-cap 1204 includes a number of second receptacles 1264 configured to receive a corresponding second end 1120 of a structure 1112. A clamp 1266 and clamping hardware 1268 is associated with each second receptacle 1264.

The end-caps 1202, 1204 may be made of varied materials such as metals, glass, ceramic, Teflon or plastics (e.g., Delrin). The end-caps 1202, 1204 may be machined or 3D printed. As described above with reference to the closed cell 250 of the optical cavity embodiment of FIG. 7, the end-caps 1202, 1204 are aligned relative to each other using optical alignment methods (instead of machine tolerances) and then attached to the structures 1112.

In some embodiments the first end-cap 1202 is fixedly attached to each structure 1112 by adhesive. In some embodiments the first end-cap 1202 is removably attached or semi-permanently attached to each structure 1112 by rotating the clamping hardware 1268 to thereby tighten the clamp 1266 against the outer surface of the structure around a circumference of the structure. Clamped as such, the clamp 1266 applies pressure evenly around the structure. In some embodiments a semi-permanent attachment of the first end-cap 1202 to the structure 1112 by the clamp 1266 and clamping hardware 1268 is turned into a permanent or fixed attachment by applying adhesive to the clamp 1266 and clamping hardware 1268, either prior to tightening the clamping hardware or after tightening the clamping hardware. Mechanical means other than a clamp 1266 and clamping hardware 1268 may be used to semi-permanent attach the first end-cap 1202 to the structure 1112. For example, threaded rods or bolt attachment, and equivalents thereof.

In some embodiments the second end-cap 1204 is fixedly attached to each structure 1112 by adhesive. In some embodiments the second end-cap 1204 is removably attached or semi-permanently attached to each structure 1112 by rotating the clamping hardware 1268 to thereby tighten the clamp 1266 against the outer surface of the structure around a circumference of the structure. In some embodiments a semi-permanent attachment of the second end-cap 1204 to the structure 1112 by the clamp 1266 and clamping hardware 1268 is turned into a permanent or fixed attachment by applying adhesive to the clamp 1266 and clamping hardware 1268, either prior to tightening the clamping hardware or after tightening the clamping hardware The first mirror 1114 is removably coupled with the first end-cap 1202 by a first mirror clamp assembly 1214 such that when the first mirror 1114 is coupled to the first end-cap 1202, the center 1218 of the first mirror is axially aligned with the center axis 1210 of the first end-cap. The first end-cap 1202 includes a mirror-landing surface 1222 and the first mirror clamp assembly 1214 includes a first body 1224 having an opening 1226 configured to removably receive the first mirror 1114. The first body 1224 is configured to be coupled to the first end-cap 1202 to secure the first mirror 1114 partially within the opening 1206 of the first end-cap such that the first mirror is adjacent to the mirror-landing surface 1222 of the first end-cap 1202. In some embodiments, a sealing o-ring 1228 is positioned between the first mirror 1114 and the mirror-landing surface 1222.

The first mirror clamp assembly 1214 includes a centering o-ring 1230. The centering o-ring 1230 positions the first mirror 1114 in the opening 1226 of the first body 1224. In some embodiments the first body 1224 of the first mirror clamp assembly 1214 includes an inward-projecting feature (not shown, but similar to the inward-projecting feature 332 in FIG. 5) and a compression o-ring 1234 that is positioned between the inward-projecting feature and the centering o-ring 1230. The compression o-ring 1234 has a hardness greater than the sealing o-ring 1228. The first mirror 1114 is secured in place adjacent to the mirror-landing surface 1222 of the first end-cap 1202 using attachment bolts 1256 that extend through holes 1258 in the first body 1224 to couple with holes 1260 formed in the first end-cap. Tightening of the attachment bolts 1256 within the holes 1260 secures the first mirror 1114 in place by compression forces.

In the embodiment of FIG. 12, the first mirror clamp assembly 1214 includes three attachment bolts 1256 and three corresponding holes 1258 that are evenly spaced apart around the first body 1224 to align with respective holes 1260 in the first end-cap 1202. Respective diameters of the attachment bolts 1256 and holes 1258, 1260 are within a tight tolerance of each other to restrain lateral movement and transverse movement of the first mirror 1114 relative to the first end-cap 1202 during assembly and reassembly (e.g., after mirror cleaning or replacement). The tight tolerances of the attachment bolts 1256 and holes 1258, 1260 function to securely place the first mirror 1114 within the first end-cap 1202 such that: 1) the optical axis of the first mirror 1114 is aligned with the optical axis of the second end-cap 1204 and the second mirror 1118, and 2) the first mirror 1114 is in place adjacent to the mirror-landing surface 1222 of the first end-cap to preserve the lateral location of the first mirror relative to the second end-cap and the second mirror. In another embodiment, the attachment bolts 1256 and holes 1260 may be configured to further restrain the lateral movement and transverse movement of the first mirror 1114 relative to the first end-cap 1202. For example, the attachment bolts 1256 and holes 1260 may have conical or hemispherical configuration to enforce centering of the bolt within the hole during tightening.

The second mirror 1118 is removably coupled with the second end-cap 1204 by a second mirror clamp assembly 1216 such that when the second mirror 1118 is coupled to the second end-cap 1204, the center (not visible) of the second mirror is axially aligned with the center axis 1212 of the second end-cap. The second end-cap 1204 includes a mirror-landing surface (not visible) (that is parallel to the mirror-landing surface 1222 of the first end-cap 1202) and the second mirror clamp assembly 1216 includes a second body 1244 having an opening 1246 configured to removably receive the second mirror 1118. The second body 1244 is configured to be coupled to the second end-cap 1204 to secure the second mirror 1118 partially within the opening 1208 of the second end-cap such that the second mirror is adjacent to the mirror-landing surface (not visible) of the second end-cap 1204. In some embodiments a sealing o-ring 1248 is positioned between the second mirror 1118 and the mirror-landing surface 342.

The second mirror clamp assembly 1216 includes a centering o-ring 1250. The centering o-ring 1250 positions the second mirror 1118 in the opening 1246 of the second body 1244. In some embodiments the second mirror clamp assembly 1216 includes an inward-projecting feature (not shown, but similar to the inward-projecting feature 352 in FIG. 5) and a compression o-ring 1254 that is positioned between the inward-projecting feature and the centering o-ring 1250. The compression o-ring 1254 has a hardness greater than the sealing o-ring 1248. The second mirror 1118 is secured in place adjacent to the mirror-landing surface (not visible) of the second end-cap 1204 using attachment bolts 1256 that extend through holes 1258 in the second body 1244 to couple with holes 1260 formed in the second end-cap. Tightening of the attachment bolts 1256 within the holes 1260 secures the second mirror 1118 in place by compression forces.

In the embodiment of FIG. 12, the second mirror clamp assembly 1216 includes three attachment bolts 1256 and three corresponding holes 1258 that are evenly spaced apart around the second body 1244 to align with respective holes 1260 in the second end-cap 1204. Respective diameters of the attachment bolts 1256 and holes 1258, 1260 are within a tight tolerance of each other to restrain lateral movement and transverse movement of the second mirror 1118 relative to the second end-cap 1204 during assembly and reassembly (e.g., after mirror cleaning or replacement). The tight tolerances of the attachment bolts 1256 and holes 1258, 1260 function to securely place the second mirror 1118 within the second end-cap 1204 such that: 1) the optical axis of the second mirror 1118 is aligned with the optical axis of the first end-cap 1202 and the first mirror 1114, and 2) the second mirror 1118 is in place adjacent to the mirror-landing surface (not visible) of the second end-cap to preserve the lateral location of the second mirror relative to the first end-cap and the first mirror. In another embodiment, the attachment bolts 1256 and holes 1260 may be configured to further restrain the lateral movement and transverse movement of the second mirror 1118 relative to the second end-cap 1204. For example, the attachment bolts 1256 and holes 1260 may have conical or hemispherical configuration to enforce centering of the bolt within the hole during tightening.

The mirrors 1114, 1118 are thus removably placeable within the end-caps 1202, 1204 such that repeatable transverse alignment (i.e., optical axis alignment) of the mirrors 1114, 1118 is established, together with repeatable lateral placement (i.e., the distance between the mirrors 1114, 1118). In other words, the respective configuration of the end-caps 1202, 1204 and the mirror clamp assemblies 1214, 1216 ensure that when a mirror 1114, 1118 is removed for cleaning or replacement, the mirror that is installed, e.g., either the same mirror after cleaning or a different mirror, is held in place within its respective end-cap 1202, 1204 in a manner that preserves both optical alignment and lateral spacing of the mirrors 1114, 1118.

Open Cell Assembly Process

Figure 13:
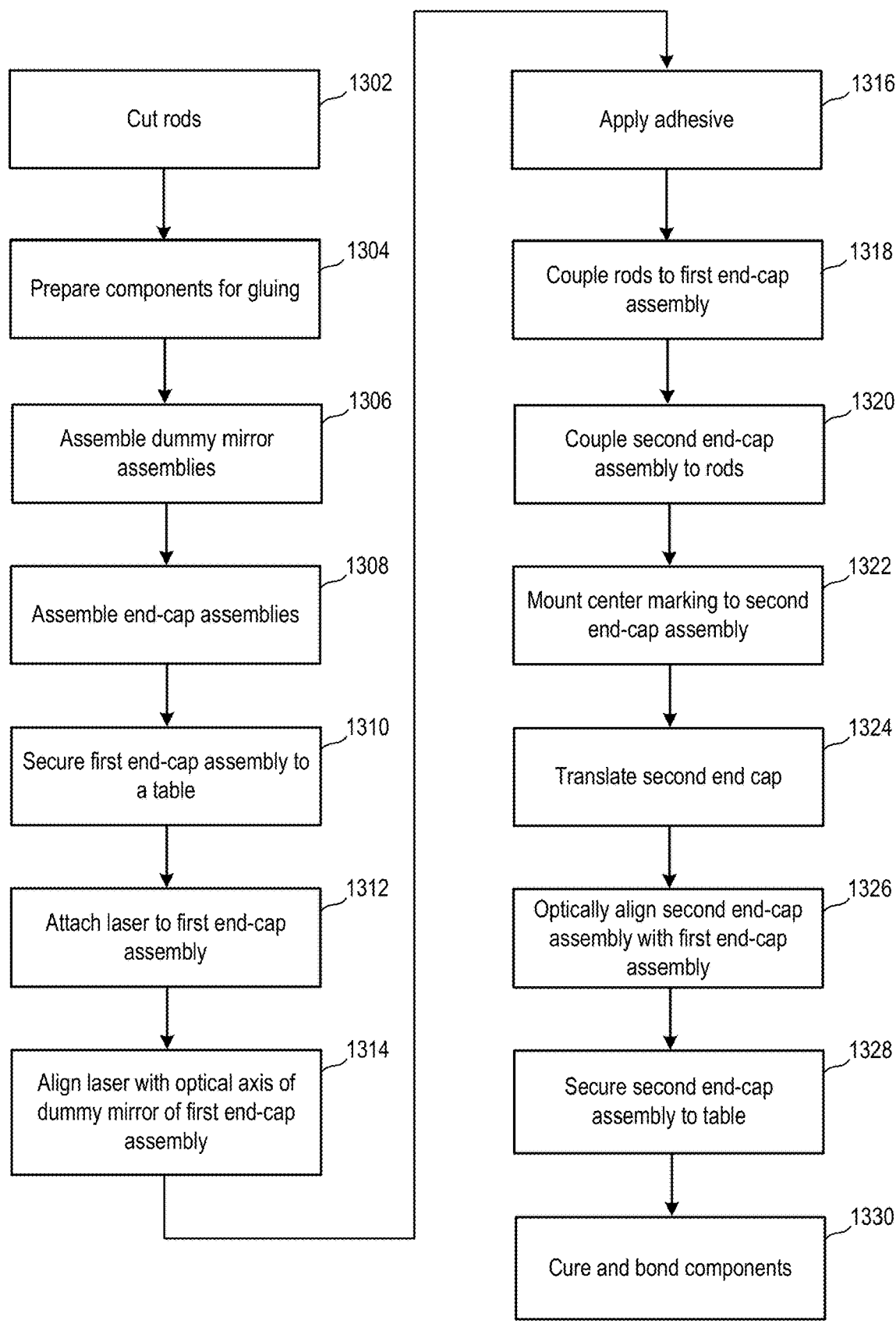
FIG. 13 is a detailed flowchart of a method of assembling an open cell of an optical cavity of FIGS. 11 and 12 in accordance with embodiments disclosed herein.

FIG. 13 is a detailed flowchart of a method of assembling an open cell for an optical cavity, such as the one shown in FIGS. 11 and 12. The method is similar to that described with reference to FIG. 7 and FIGS. 8A-9D, except a set of structures 1112, e.g., rods, is used in place of a tube 212. In particular, when referring to FIGS. 8A-9D it is understood the tube 212 in these figures is replaced with four rods 1112. Similarly, components with reference numbers in the 200's are replaced with components having reference numbers in the 1100's, and components with reference numbers in the 300's are replaced with components having reference numbers in the 1200's.

At block 1302, each of four structures 1112 (herein after referred to as rods) is cut to a length slightly longer than the desired optical cavity length. The length of each rod 1112 is generally equal to the desired optical cavity length plus the depth of the receptacle 1262, 1264 into which each end of the rod will be inserted. The optical cavity length is the distance between the center of the first mirror 1114 and the center of the second mirror 1118. An optical cavity 1100 assembled in accordance with the method of FIG. 13 may have a length between 1 centimeter and 10 meters. In one example, for an optical cavity 1100 having a length of 28 cm (11.02 in), the corresponding length for each rod 1112 is 25.46 cm (10.02 in), with the offset from each end 1116, 1120 of the rod to the surface of its respective mirror 1114, 1118 being 1.27 cm for a total of 2.54 cm (1 in). The rods 1112 may be cut using an end mill and the diamond coated mill. The rods 1112 may be a carbon fiber rod.

At block 1304, components of the optical cavity 1100 are prepared for gluing. To this end, the ends 1116, 1120 of each rods 1112 are deburred with 150 grit sand paper. A portion, e.g., the last 0.64 cm (0.25 in), of each end 1116, 1120 of each rod 1112 is roughened to improve adhesion. The interior surfaces of the first end-cap 1202 and the second end-cap 1204 are roughened with 150 grit sand paper. The rods 1112 and the end-caps 1202, 1204 are cleaned and dried. For example, the components 1112, 1202, 1204 are cleaned with a liquid soap and hot water and rinsed. Each component 1112, 1202, 1204 is then cleaned and sonicated with isopropyl alcohol, and then baked at 150 F for 30 min to dry.

At block 1306, dummy mirror assemblies similar to the dummy mirror assemblies 802, 804 shown in FIG. 8A are assembled using partially reflective mirrors 814, 818 instead of highly reflective mirrors 1114, 1118. The partially reflective mirrors enable visibility of multiple reflections of light. For example, the partially reflective mirrors may have a reflectivity of about 50%. To this end, a first partially reflective mirror 814 is placed in a first body 1224 together with a compression o-ring 1234 and a centering o-ring 1230 to form a first dummy mirror assembly. A second partially reflective mirror 818 is placed a second body 1244 together with a compression o-ring 1254 and a centering o-ring 1250 to form a second dummy mirror assembly.

At block 1308, two end-cap assemblies similar to the end-cap assemblies 806, 808 shown in FIG. 8B are assembled. To this end, the first dummy mirror assembly is attached to a first end-cap 1202 together with a sealing o-ring 1228 to form a first end-cap assembly. The second dummy mirror assembly is attached to a second end-cap 1204 together with a sealing o-ring 1248 to form a second end-cap assembly. The two end-cap assemblies make a complete, rigid and repeatable mirror plus end-cap assembly.

At block 1310 and similar to that shown in FIG. 8C, the first end-cap assembly is secured to a table 810 using clamps 820a, 820b.

At block 1312 and similar to the way shown in FIG. 8C, a laser source 822 is aligned relative to the first partially reflective mirror such that transverse movement (up/down movement in FIG. 8C) of the laser beam falls on the optical axis of the first partially reflective mirror, where the optical axis is the axis normal to the surfaces of the first partially reflective mirror. To this end, the laser source can be attached to the first end-cap assembly using mechanical rods. In FIG. 8C, the laser source 822 is positioned such that the retro-reflected laser 830 is not aligned with the optical axis 826.

At block 1314 and similar to the way shown in FIG. 8D, the position of the laser source 822 is adjusted until the retro-reflected laser 830 is aligned such that the laser beam 824 is aimed along the optical axis 826 of the first partially reflective mirror 814.

At block 1316 and similar to the way shown in FIG. 8E, adhesive is applied to the first end 1116 of each rod 1112 and the second end 1120 of each rod.

At block 1318 and similar to the way shown in FIG. 8F, the first end 1116 of each rod 1112 is mechanically coupled to the first end-cap assembly. To this end, the first end 1116 of each rod 1112 is inserted into a respective receptacle 1262 of the first end-cap assembly. Each rod 1112 is spun to distribute the adhesive uniformly around and between the outer surface of the first end 1116 of the rod 1112 and the interior surface of the first end-cap 1202 inside the receptacle 1262. At this stage, the second ends 1120 of the rods 1112 are supported by hand in free space.

At block 1320 and similar to the way shown in FIG. 8G, the second end-cap assembly is coupled to the rods 1112. To this end, the second end-cap assembly is placed relative to the rods 1112 such that each of the second ends 1120 of the rods is respectively received by a receptacle 1264 of the second end-cap assembly. Each rods 1112 is spun to distribute the adhesive uniformly around and between the outer surface of the second end 1120 of structure and the interior surface of the second end-cap 1204 inside the receptacle 1264. Clamping hardware 1268 is used to loosely retain the first end of each rod 1112 in its respective receptacle 1262 and the second end 1120 of each rod 1112 in its respective receptacle 1264.

At block 1322 and similar to that shown in FIG. 8G, a marker 832 is aligned relative to the second end-cap assembly such that an iris/aperture/center 834 of the marker coincides with the mechanical center 836 of the second partially reflective mirror 818. For example, the marker 832 may be mechanically mounted to rods 838 that screw into the second end-cap 1204.

At block 1324 and similar to the way shown in FIG. 8H, the second end-cap assembly, which is not mounted to the table 810, is centered on the optical axis 826. To this end, an alignment laser beam 824 is output by the laser source 822 and the second end-cap assembly is translated transverse (e.g., up/down, side-to-side) to the optical axis 826 and relative to the second ends 1120 of the rods 1112 to center the alignment laser beam 824 on the center 834 of the marker. It is noted that translation of the second end-cap assembly relative to the second ends 1120 of the rods 1112 is possible because the adhesive at the second end 1120 of the rods 1112 has not yet cured and the second ends 1120 of the rods 1112 are loosely retained in the receptacles 1264 by the clamping hardware 1268. Furthermore, a space or gap separates the outer surface of the second ends 1120 of the rods 1112 and the inner wall of the receptacles 1264. This gap is filled with uncured adhesive at this stage of the assembly process and thus allows for translation of the second end-cap assembly. For example, a gap between the outer surface of the second ends 1120 of the rods 1112 and the inner wall of receptacles 1264 of 0.00508 cm (0.002 in) to 0.127 cm (0.05 in) allows for the required translational (i.e., transverse movement) and tip/tilt (i.e., angular movement) operations.

At block 1326 and similar to the way shown in FIG. 8I, the second end-cap assembly is optically aligned with the first end-cap assembly. To this end, the laser source 822 attached to the first end-cap assembly outputs a laser beam 824 toward the second end-cap assembly. Multiple reflections of the laser beam 824 between the first partially reflective mirror 814 of the first end-cap assembly and the second partially reflective mirror 818 of the second end-cap assembly are observed on a screen 840 placed about 1 m away from the second end-cap assembly. The angle (or tip/tilt) of the second end-cap assembly 808 is adjusted to achieve alignment of the multiple reflections. The gap between the outer surface of the second ends 1120 of the rods 1112 and the inner wall of the receptacles 1264 allows for angular adjustment of the second end cap. Again, this gap is filled with uncured adhesive at this stage of the assembly process.

With reference to FIGS. 9A and 9B, when the second end-cap assembly is not optically aligned with the first end-cap assembly, multiple reflections of the laser beam 824 between the first partially reflective mirror 814 and the second partially reflective mirror 818 appear on a screen 840 as separate spots of light. With reference to FIGS. 9C and 9D, when the second end-cap assembly is optically aligned with the first end-cap assembly, multiple reflections of the laser beam 824 between the first partially reflective mirror 814 and the second partially reflective mirror 818 overlap and appear on a screen 840 as a single spot of light.

At block 1328, after the second end-cap assembly is optically aligned with the first end-cap assembly, the second end-cap assembly 808 is secured to the table 810 to maintain the spot overlap shown in FIG. 9D.

At block 1330, the assembled optical cavity is cured and bonded. To this end, the adhered components of the cavity are cured for 12-24 hours. After curing, the optical cavity is inspected for any movement of components and unclamped from the table 810. The optical cavity is then oven cure at 150 F for 60 min to maximize bond strength.

After curing is completed, the first dummy mirror assembly 802 is decoupled from the first end-cap 1202 and the second dummy mirror assembly 804 is decoupled from the second end-cap 1204 to provide an open cell 1150 having end-caps that are optically aligned and permanently attached to opposite ends of the set of rods such that respective mirror-landing surfaces of the end-caps are substantially parallel.

In the foregoing method of assembly, adhesive is used to permanently attach the first end-cap 1202 and the second end-cap 1204 to the rods 1112. In some embodiments, the first end-cap 1202 and the second end-cap 1204 can be semi-permanently attached to the rods 1112 using only mechanical means and no adhesive. In this alternative assembly method, block 1304 is not performed, the spinning of the rods 1112 in blocks 1318 and 1320 to distribute adhesive is not performed, and the curing and bonding in block 1330 is not performed. Instead, after the after the second end-cap assembly is optically aligned with the first end-cap assembly and the second end-cap assembly 808 is secured to the table 810 in block 1328, the clamping hardware 1268 is tightened to securely retain the first end of each rod 1112 in its respective receptacle 1262 and the second end 1120 of each rod 1112 in its respective receptacle 1264.

Figure 14:
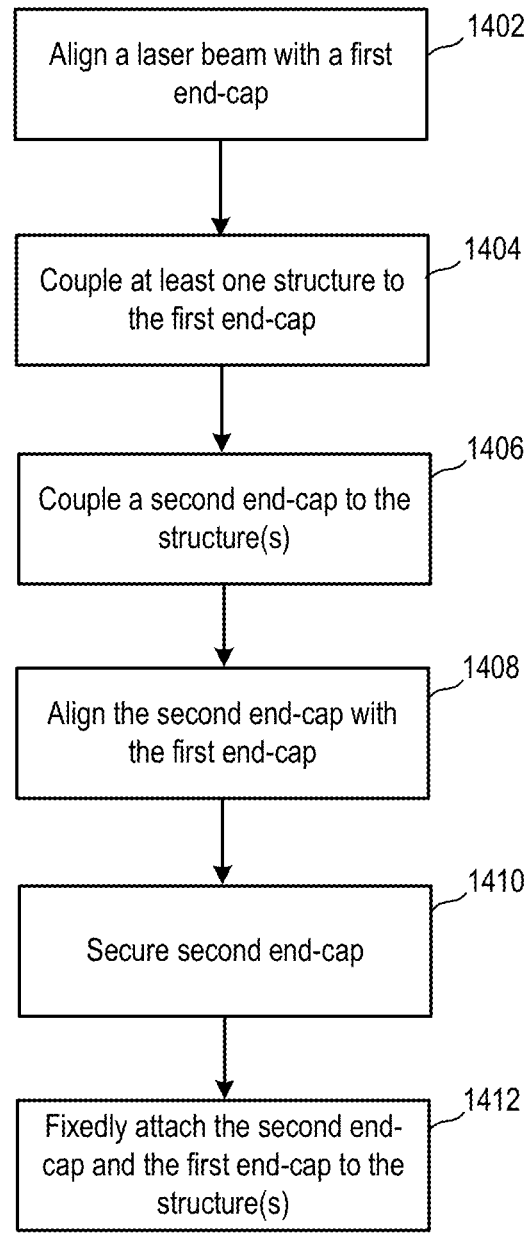
FIG. 14 is a general flowchart of a method of assembling an open cell of an optical cavity in accordance with embodiments disclosed herein.

With reference to FIG. 14, a general method of assembling an open cell of an optical cavity in accordance with embodiments disclosed herein includes:

At block 1402, a laser beam is aligned with a first end-cap. To this end the laser beam is aligned with an optical axis of a first mirror that is secured in a first end-cap, which is secured in place relative to a surface. As part of this alignment process, a source of the laser beam is attached to the first end-cap, and the alignment of the source is adjusted relative to the first mirror such that transverse movement of the laser beam falls on the optical axis of the first mirror.

At block 1404, a first end of at least one structure, e.g., a rod or rail or tube, is coupled to the first end-cap. To this end, adhesive is optionally applied to the first end and the first end is inserted into a receptacle 1262 of the first end-cap.

At block 1406, a second end-cap is coupled to a second end of the at least one structure. To this end, adhesive is optionally applied to the second end and the receptacle 1264 of the second end-cap is placed over the second end of the at least one structure.

At block 1408, the second end-cap is optically aligned with the first end-cap. To this end, a laser beam is directed from the source toward a second mirror secured in the second end-cap. And the second end-cap is translated until an alignment of multiple reflections of the laser beam between the first mirror and the second mirror is obtained. For example, an alignment of multiple reflections of the laser beam between the first mirror and the second mirror may be observed as a single spot of light in a spot pattern.

At block 1410, the second end-cap is secured in place relative to the surface.

At block 1412, the first end of the at least one structure is secured to the first end-cap and the second end of the at least one structure is secured to the second end-cap. To this end, in some embodiments an adhesive between the first end of the structure and the first end-cap is cured, and an adhesive between the second end of the rod and the second end-cap is cured to fixedly attach the first end-cap and the second end-cap to the rod. The adhesive may be the adhesive applied in blocks 1404 and 1406. In some embodiments, the first end-cap and the second end-cap are semi-permanently attached to the rod using mechanical means.

After the first end of the at least one structure is fixedly secured to the first end-cap and the second end of the at least one structure is fixedly secured to the second end-cap, the first mirror can be removed from the first end-cap and the second mirror can be removed from the second end-cap. The remaining mechanical structure, e.g., the at least one structure and the first end-cap and the second end-cap, is an open cell in which mirrors may be repeatedly installed and removed.

The open-cell optical cavity and method of assembly disclosed herein have the following numerous advantages.

The end-caps 1202, 1204 are optically pre-aligned and permanently affixed (or fixedly attached) to the structure(s) during assembly. Additionally, because the end-cap-to-end-cap (or, equivalently, mirror-to-mirror) alignment is achieved with a laser beam prior to complete adhesion, the alignment can be more accurate than machined cells. The metal-glass interface between the mirrors 1114, 1118 and the end-caps 1202, 1204 of the optical cavity 1100 allows for repeated removal and insertion of the mirrors (e.g., for cleaning) while maintaining end-cap-to-end-cap (or, equivalently, mirror-to-mirror) optical alignment. The metal-glass interface between the mirrors 1114, 1118 and the end-caps 1202, 1204 provides an optical cavity 1100 that is robust to shock, vibration, and thermal fluctuations.

The component cost of the optical cavity 1100 is reduced relative to the approaches mentioned in the background of this disclosure because the size of the machined object is reduced, the tolerances may be relaxed, and the long bore step is eliminated. An optical cavity 1100 of much longer length can be fabricated while meeting the strictest face parallelism requirements of multi-pass and cavity enhanced absorption spectroscopies.

The weight of the optical cavity 1100 is reduced relative to the approaches mentioned in the background of this disclosure because components of the optical cavity, such as the structure(s) 1112, can be made from alternative materials (e.g., carbon fiber). The temperature sensitivity of the optical cavity 1100 can be reduced components of the optical cavity, such as the structure(s) 1112, can be made from low thermal coefficient of expansion materials.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of assembling a cell for an optical cavity, the method comprising:
    aligning a laser beam with an optical axis of a first mirror secured in a first end-cap that is secured in place relative to a surface, the first end-cap having an opening and at least one receptacle off axis from the axis of the opening;
    coupling a first end of at least one structure to the first end-cap by inserting the first end of the at least one structure into the at least one receptacle of the first end-cap;
    coupling a second end-cap to a second end of the at least one structure;
    optically aligning the second end-cap with the first end-cap;
    securing the second end-cap in place relative to the surface; and
    attaching the first end of the at least one structure to the first end-cap and the second end of the at least one structure to the second end-cap.

2. The method of claim 1, wherein aligning a laser beam with an optical axis of a first mirror comprises:
    attaching a source of the laser beam to the first end-cap; and
    adjusting the alignment of the source relative to the first mirror such that transverse movement of the laser beam falls on the optical axis of the first mirror.

3. The method of claim 2, wherein optically aligning the second end-cap with the first end-cap comprises:
    directing a laser beam from the source toward a second mirror secured in the second end-cap; and
    translating the second end-cap until an alignment of multiple reflections of the laser beam between the first mirror and the second mirror is obtained.

4. The method of claim 1, wherein the second end-cap comprises an opening and at least one receptacle off axis from the axis of the opening, and coupling a second end of at least one structure to the second end-cap comprises:
    placing the at least one receptacle of the second end-cap over the second end of the at least one structure.

5. The method of claim 1, wherein attaching the first end of the at least one structure to the first end-cap and the second end of the at least one structure to the second end-cap comprises securing the first end of the at least one structure within the at least one receptacle using a clamping structure and securing the second end of the at least one structure within the at least one receptacle using a clamping structure.

6. The method of claim 1, wherein the first end of the at least one structure is fixedly attached to the first end-cap and the second end of the at least one structure is fixedly attached to the second end-cap by:
    curing an adhesive between the first end of the at least one structure and the first end-cap; and
    curing an adhesive between the second end of the at least one structure and the second end-cap.

7. A cell for an optical cavity, the cell comprising:
    at least one structure with a first end and a second end;
    a first end-cap attached to the at least one structure at the first end and having an opening with a center axis and a clamping structure adjacent a receptacle configured to receive the first end of the at least one structure, the first end-cap being attached to the at least one structure by the clamping structure and clamping hardware; and
    a second end-cap attached to the at least one structure at the second end and having an opening with a center axis that is axially aligned with the center axis of the first end-cap and a clamping structure adjacent to a receptacle configured to receive a second end of the at least one structure, the second end-cap being attached to the at least one structure by the clamping structure and clamping hardware.

8. The cell of claim 7, wherein the at least one structure has a length between 1 centimeter and 10 meters.

9. The cell of claim 7, further comprising cured adhesive between respective surfaces of the first end-cap and the at least one structure, and between respective surfaces of the second end-cap and the at least one structure, wherein the cured adhesive fixedly attaches the first end-cap and the second end-cap to the at least one structure.

10. The cell of claim 7, further comprising cured adhesive between respective surfaces of the clamping structure of the first end-cap and clamping hardware, and between respective surfaces of the clamping structure of the second end-cap and clamping hardware, wherein the cured adhesive fixedly attaches the first end-cap and the second end-cap to the at least one structure.

11. The cell of claim 7, wherein:
    the first end-cap comprises a first mirror-landing surface configured to receive a perimeter portion of a first mirror;
    the second end-cap comprises a second mirror-landing surface configured to receive a perimeter portion of a second mirror; and
    the first mirror-landing surface and the second mirror-landing surface are substantially parallel.

12. The cell of claim 7, wherein the at least one structure comprises a tube that is axially aligned with the center axis of the first end-cap and the center axis of the second end-cap.

13. A cell for an optical cavity, the cell comprising:
    at least one structure with a first end and a second end;
    a first end-cap attached to the at least one structure at the first end and having an opening with a center axis; and
    a second end-cap attached to the at least one structure at the second end and having an opening with a center axis that is axially aligned with the center axis of the first end-cap,
    wherein the at least one structure comprises a plurality of rods, each off axis from the center axis of the first end-cap and the center axis of the second end-cap.

14. An optical cavity comprising:
at least one structure with a first end and a second end;
a first end-cap attached at the first end and having an opening with a center axis and at least one receptacle off axis from the center axis and configured to receive the first end;
a second end-cap attached at the second end and having an opening with a center axis and at least one receptacle off axis from the center axis and configured to receive the first end, the center axis optically aligned with the center axis of the first end-cap;
a first mirror removably coupled with the first end-cap by a first mirror clamp assembly such that the center of the first mirror is axially aligned with the center axis of the first end-cap; and
a second mirror removably coupled with the second end-cap by a second mirror clamp assembly such that the center of the second mirror is axially aligned with the center axis of the second end-cap.

15. The optical cavity of claim 14, wherein:
the first end-cap comprises a first mirror-landing surface and the first mirror clamp assembly comprises a first body having an opening configured to removably receive the first mirror and to be coupled to the first end-cap to secure the first mirror adjacent to the first mirror-landing surface of the first end-cap,
the second end-cap comprises a second mirror-landing surface and the second mirror clamp assembly comprises a second body having an opening configured to removably receive the second mirror and to be coupled to the second end-cap to secure the second mirror adjacent the second mirror-landing surface of the second end-cap.

16. The optical cavity of claim 15, wherein:
each of the first mirror and the second mirror is secured in place adjacent to the respective mirror-landing surface by compression forces.

17. The optical cavity of claim 15, wherein:
the first mirror clamp assembly comprises a centering o-ring configured to position the first mirror in the opening of the first body; and
the second mirror clamp assembly comprises a centering o-ring configured to position the second mirror in the opening of the second body.

18. The optical cavity of claim 15, wherein each of the first body of the first mirror clamp assembly and the second body of the second mirror clamp assembly comprises:
an inward-projecting feature; and
a compression o-ring positioned between the inward-projecting feature and a centering o-ring.

19. The optical cavity of claim 15, wherein:
the at least one structure comprises a plurality of structures, each with a first end and a second end,
the at least one receptacle of the first end cap comprises a plurality of receptacles, each configured to receive a respective first end, and
the at least one receptacle of the second end cap comprises a plurality of receptacles, each configured to receive a respective second end.

* * * * *